(12) United States Patent
Lewis

(10) Patent No.: US 6,175,574 B1
(45) Date of Patent: *Jan. 16, 2001

(54) TECHNIQUE FOR PROVIDING AN IMPROVED SIGNALING NETWORK FOR TELEPHONE SYSTEMS

(75) Inventor: Karl M. Lewis, Winter Springs, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/730,251

(22) Filed: Oct. 15, 1996

Related U.S. Application Data

(63) Continuation of application No. 08/425,321, filed on Apr. 17, 1995, now abandoned, which is a continuation of application No. 08/282,388, filed on Jul. 29, 1994, now abandoned, which is a continuation of application No. 08/116,161, filed on Sep. 2, 1993, now abandoned.

(51) Int. Cl.[7] .................................... H04J 1/00
(52) U.S. Cl. ............................ 370/522; 379/230
(58) Field of Search ................... 370/352, 355, 370/360, 389, 392, 410, 426, 496, 465, 467, 401, 522, 524; 379/207, 211, 220, 221, 230, 237, 112, 115, 232, 196, 231

(56) References Cited

U.S. PATENT DOCUMENTS

| | | | |
|---|---|---|---|
| 4,224,479 | * 9/1980 | Crawford | 379/196 |
| 5,008,929 | * 4/1991 | Olsen et al. | 379/112 |
| 5,029,165 | * 7/1991 | Choi et al. | 370/94.1 |
| 5,048,081 | * 9/1991 | Gavaras et al. | 370/60.1 |
| 5,136,636 | * 8/1992 | Wegrzynowicz | 379/127 |
| 5,247,571 | * 9/1993 | Kay et al. | 379/207 |
| 5,268,895 | * 12/1993 | Topper | 370/68.1 |

\* cited by examiner

Primary Examiner—Dang Ton
(74) Attorney, Agent, or Firm—Joseph S. Codispoti

(57) ABSTRACT

Apparatus and a concomitant method of providing a technique, within each central office (CO) in a digital CO cluster, for translating a destination number for a signaling message into a destination point code. Such a CO generally contains a switching system, for providing an interface to various station lines (telephone lines) and links to other DCOs, and/or an A-link consolidator (ALC), and an SS7 signaling processing system for providing a software based control system to properly format, address and route signaling messages. Through the invention, the SS7 signaling processing system first translates a destination number into a destination point code. The destination point code is then incorporated into a signaling message. The signaling message is subsequently routed to a destination node that corresponds to the destination point code. The destination point code indicates either a CO within the cluster or an STP outside of the cluster. Advantageously, use of the invention eliminates the need to translate the destination number into the destination point code without accessing an SS7 node outside of the CO cluster.

52 Claims, 8 Drawing Sheets

TECHNIQUE FOR PROVIDING AN IMPROVED SIGNALING NETWORK FOR TELEPHONE SYSTEMS

CROSS-REFERENCE TO RELATED APPLICATION

This is a continuation of Ser. No. 08/425,321 filed Apr. 17, 1995 now abandoned which is a continuation of Ser. No. 08/282,388 filed Jul. 29, 1994 now abandoned which is a continuation of Ser. No. 08/116,161 filed Sep. 2, 1993 now abandoned.

BACKGROUND OF THE DISCLOSURE

1. Field of the Invention

The invention relates to signaling networks for telephone systems, and particularly to apparatus and concomitant methods for providing signaling paths within a network of service switching points.

2. Description of the Existing Art

Modern telephony networks contain two networks, one for carrying communication signals (a communications network) and another for carrying signaling and switching control signals (a signaling network). The signaling and switching control signals are hereinafter referred to as signaling messages. These two networks, each containing a plurality of connective pathways interconnecting a plurality of nodes, operate in a symbiotic manner. The signaling network creates a specific path by activating certain switches within a communications network to facilitate formation of a communication path between, for example, a telephone at one station and a telephone at another station. As a result of the communication path, the parties at each station can communicate to one another through the communications network. Alternatively, the signaling network is used to communicate information such as network management and control information between nodes.

Generally, individual central offices form nodes within both the signaling network and the communications network. Each central office contains switching equipment controlled by the signaling messages to produce communication paths through the node. Additionally, each central office contains communication equipment that is used for communication signal processing within the node. However, though the communications network and the signaling network use the same nodes, signaling messages and communication signals are not propagated along the same connective pathways (trunks) between nodes. Since the signaling network operates using signaling messages that do not propagate along the communication network trunks, the signaling network is said to facilitate out-of-band signaling, i.e., the signaling network is an out-of-band network.

Such out-of-band signaling has become standard in the United States telephone system and the telephony equipment industry. The specification for a United States out-of-band signaling network standard is known as the United States National Common Channel Signaling System Number 7 (hereinafter referred to as "SS7"). This standard is specified in American National Standards Institute (ANSI) Standard T1.111-1988. International SS7 networks are specified in Consultative Committee on International Telephone and Telegraph (CCITT) Recommendation Q.705. This recommendation contains a specification for an international Common Channel Signaling (CCS) Network standard. CCS, as with SS7, is a signaling network overlay to a voice carrying trunk circuit network (communications network). SS7 and CCS use almost identical signaling protocols for propagating packet-switched signaling messages through the signaling network. Since the United States protocols and the international protocols are nearly identical, the remainder of this discussion focuses primarily upon SS7.

Typically, an SS7 network comprises a number of SS7 nodes interconnected by various types of pathways. In particular, the SS7 nodes include, inter alia, service switching points (SSPs) and signaling transfer points (STPs). Other types of nodes are used within an SS7 network; however, these nodes are not relevant here and will not be discussed. Therefore, for simplicity, an SS7 network is hereinafter defined as only containing SSPs and STPs.

Generally, the SS7 nodes are arranged within the network in groups. Groups of STPs and SSPs form individual local access transport areas (LATAs). These individual LATAs are interconnected by STPs within a long distance carrier portion of the SS7 network. Typically, individual LATAs are operated by individual Bell Operating Companies (BOCs). However, independent telephone companies (ITCs) can also exist within a given LATA and operate distinct clusters of SSPs (hereinafter referred to as ITC clusters) therein. In some instances, an ITC cluster, rather than being solely contained within a single LATA, may overlap and operate within two geographically adjacent LATAs.

During various signaling message routing operations originating within an ITC cluster (discussed below), an STP operated by the BOC (hereinafter referred to as BOC STPs) must be accessed. Traditionally, each SSP within an ITC cluster was individually connected to one or more BOC STPs. However, since independent telephone companies that operate these SSPs are charged by the BOC for each physical link connected to the BOC STP (known as an A-link), the independent telephone companies have begun to use A-link consolidators (ALC) to limit the number of connections to each BOC STP. An ALC is an SSP that is specially designed to route signaling messages from a number of A-links to a single A-link. In general, a number of SSPs forming a particular SSP cluster is connected to one or more ALCs. Each ALC, in turn, is connected through two A-links to one or more BOC STPs. As such, the independent telephone companies which operate a given SSP cluster are only charged for two physical links from each ALC to the BOC STPs.

As is well known in the art, certain messages propagating from any one SSP to another SSP, even if the two SSPs are within the same LATA or even within the same cluster, must access a BOC STP. One type of these signaling messages is known as custom local area signaling services (CLASS) messages. CLASS messages are sent between SSPs to facilitate use of special customer services such as automatic recall (AR), automatic callback (AC) and screening list editing (SLE). Those skilled in the art will readily understand the operation and function of these services as well as the utilization of CLASS messages to facilitate these services. Therefore, CLASS messages and their function will not be discussed in detail herein.

To appropriately route a CLASS message, the SS7 protocol requires a target destination number, e.g., a telephone number dialed by a caller, to be translated into a destination point code. The destination point code typically is a 24-bit address of a node (switching or signaling point) within the SS7 network. The node indicated by the destination point code is typically the node connected to the telephone associated with the target-destination number. The translation process is accomplished by a BOC STP within the LATA containing the ITC cluster from which the call is made. An A-link connects the STP to an ALC within the ITC cluster. In operation, each CLASS message that must be transferred between SSPs is routed to an STP for translation. As a result of the translation, the STP re-addresses the CLASS message and sends the message either through the SS7 network to a destination SSP within another SSP cluster (inter-cluster signaling) or to a destination SSP within the cluster from which the message originated (intra-cluster signaling). In either instance, the appropriately re-addressed message is received by the destination SSP. In response to the signaling message, the destination SSP performs appropriate switching functions or, depending on the type of CLASS message, the SSP returns certain information, e.g., a previously dialed telephone number, to the SSP which sent the message (originating SSP).

Unfortunately, use of an STP engenders several drawbacks. First, if the independent telephone companies could avoid STP access for destination number translation, then the delay inherent is routing a message between SSPs via an STP, could be greatly reduced. Furthermore, STP network access adds an unnecessary time delay and network complexity to intra-cluster message routing caused by accessing the STP and subsequently returning a translated message to the cluster that accessed the STP. Now, if the SS7 functions, in particular the translation function, are performed within an SSP itself for intra-cluster signaling message routing, a substantial reduction in network complexity and processing time savings could be achieved.

Thus, a need exists in the art for a technique that performs some of the SS7 network functions within the SSPs of an SSP cluster. In particular, a need exists for apparatus and concomitant methods for translating destination numbers into destination point codes within the SSPs of an SSP cluster.

SUMMARY OF THE INVENTION

Advantageously, the present invention provides a technique for facilitating intra-cluster service switching point SSP-to-SSP signaling message routing without accessing a signaling transfer point (STP).

In that regard, an object of the invention is to provide a destination number to destination point code translating facility within each SSP in an SSP cluster.

Another object of the invention is to provide such a translating facility which is fully compatible with the SS7 network protocol.

These and other objects are achieved in accordance with the present invention by providing a technique, within each SSP, for translating a destination number into a destination point code. The destination point code is appropriately inserted into a signaling message to facilitate proper routing of the signaling message to a destination SSP or, if necessary, an STP.

In general, the present invention is incorporated into signaling message routing control software of a digital central office, such as the DCO, a registered trademark of Siemens Stromberg-Carlson of Boca Raton, Fla. Such a central office is more generally known by those skilled in the art as an SSP.

Specifically, the present invention facilitates routing of signaling messages known in the art as custom local area signaling services (CLASS). An SSP generally contains a switching system for providing an interface to various station lines (telephone lines) and links to other SSPs and/or an A-link consolidator (ALC). Additionally, an SSP contains an SS7 signaling processing system for providing a software based control system to properly format, address and route signaling messages including CLASS messages. Whenever a telephone user requests a CLASS service such as automatic callback, automatic redial, or screen list editing, the SS7 signaling processing system generates a CLASS message. Thereafter, in accordance with the invention, the SS7 signaling processing system translates a destination number dialed by the telephone user into a destination point code and incorporates the destination point code into the CLASS message. The CLASS message is subsequently routed to a destination node that corresponds to the destination point code. The destination point code indicates either an SSP within the SSP cluster or an STP. The STP is only accessed when either the destination number is not recognized, i.e., an incorrectly dialed number, or the SSP to which the message must be addressed is outside the SSP cluster which originated the message. If a destination point code for a particular STP is generated, then the signaling message is routed to that STP for further translation and routing to an SSP that is not within the SSP cluster that originated the CLASS message.

More specifically, the inventive technique maps a destination number into a destination point code using two tables; namely, an NPA table and an NXX table. Typically, a destination number has the form NPA-NXX-XXXX, where NPA is a three digit number corresponding to the numbering plan area (NPA), commonly known as an area code, NXX is a three digit office code, and XXXX is a four digit number corresponding to a destination station (telephone) number. The inventive technique uses the NPA number to address the NPA table and the NXX number to address the NXX table.

An information field exists at each address in the NPA table and contains information to instruct the SS7 signaling processing system as to how to handle the CLASS message. For example, the information field may contain a destination point code of an STP. In that case, the SS7 signaling processing system would send the CLASS message to the STP at that destination point code for further processing and routing. On the other hand, the information field in the NPA table may contain information instructing the SS7 signaling processing system to process the destination number using the NXX table. Accordingly, the SS7 signaling processing system uses the NXX number to access an information field within the NXX table that corresponds to that particular NXX number. Thus, generally speaking, the information field in the NXX table also contains information to appropriately route the signaling message, e.g., a destination point code of an STP or the destination point code of an intra-cluster SSP. Therefore, the inventive technique facilitates intra-cluster routing of signaling messages, specifically, CLASS messages, without accessing an STP.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to various figures.

DETAILED DESCRIPTION

A discussion of the rudiments of telephone signaling network operations follows in order to provide the reader with a basic understanding of telephone signaling networks and the terminology involved in describing such networks. With the basics of these networks understood, the reader will better understand the operation and function of the invention.

A. BACKGROUND

Figure 1:
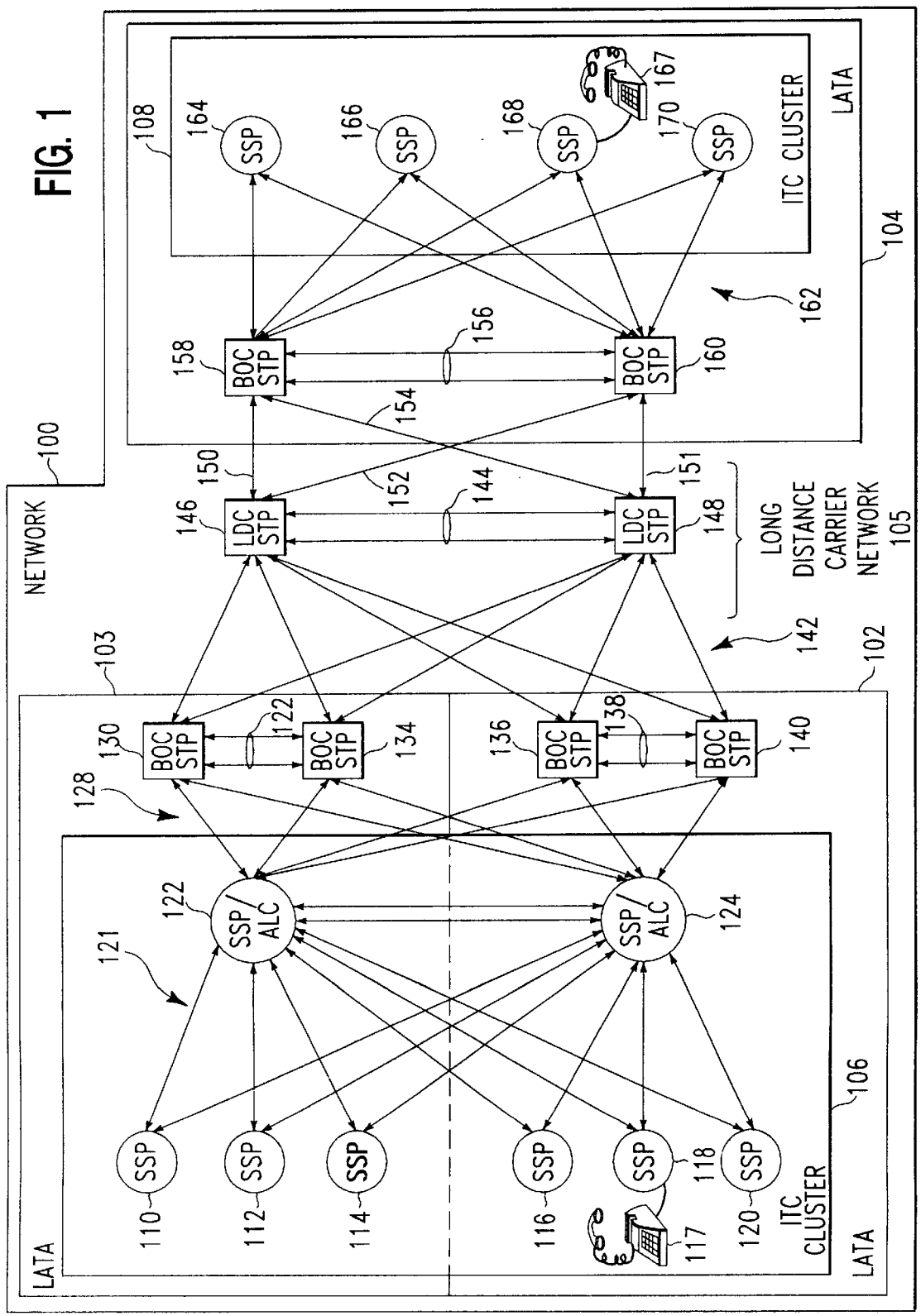
FIG. 1 depicts a block diagram of an improved signaling network 100 which incorporates the present inventive technique in the illustrative context of use with an independent telephone company (ITC) owned cluster 106 of service switching points (SSPs)

FIG. 1 depicts a block diagram of signaling network 100 incorporating the inventive technique for improving signaling message routing for a cluster of service switching points (SSPs). In general, signaling network 100 comprises a number of signaling system 7 (SS7) nodes shown here as SSPs and signaling transfer points (STPs) that are interconnected by a plurality of pathways. SSPs and STPs process and route signaling messages through network 100. The specific function of SSPs and STPs is discussed in detail below. Generally speaking, signaling network 100 functions in conjunction with a communications network (not shown). Both networks utilize the same SS7 nodes but carry signals between the nodes on different pathways (trunks). In operation, signaling messages propagate through the signaling network to control switches in the communications network such that a communications link is established between nodes in the communications network. Additionally, the signaling network propagates messages between nodes which carry network management and control information. The specific operation of the signaling network is discussed in detail below.

1. Illustrative Network Topology

A signaling network permits communication of signaling messages between and amongst various SSPs, illustratively shown as SSPs 110–124 and 164–170. These SSPs are organized into defined groups known in the art as local access transport areas (LATAs). Illustratively, network 100 contains three LATAs 102, 103 and 104. In practice, of course, any number of LATAs may exist within network 100. Long distance carrier (LDC) network 105 connects LATAs 102 and 103 to LATA 104. In general, each LATA contains a number of SSPs and STPs, here illustratively shown as being operated by Bell Operating Companies (BOCs) (hereinafter referred to as BOC SSPs and BOC STPs). For simplicity, only two BOC STPs and no BOC SSPs are shown in each LATA. Within LATA 104 is cluster 108 of SSPs operated by an independent telephone company (ITC). Hereinafter, such a cluster is referred to as an ITC cluster. Additionally, an ITC cluster can overlap two LATAs, i.e., the ITC cluster contains SSPs located in two different LATAs. Such a cluster is depicted as ITC cluster 106 overlapping LATA 102 and LATA 103. ITC cluster 106 contains SSPs 110, 112, 114 and 122 in LATA 103; and SSPs 116, 118, 120 and 124 in LATA 102. ITC cluster 108 contains SSPs 164, 166, 168 and 170. Connective pathways 121, known as A-links, connect the SSPs in cluster 106 to two A-link consolidator 122 and 124 (ALCs). An ALC is, in essence, a specially configured SSP capable of routing signals from A-links as well as from station lines. By using A-link consolidators, many SSPs can be connected to a pair of BOC STPs within a LATA via four links, specifically, links 128. Consequently, the independent telephone company which operates cluster 106 is charged by the BOC as owner of STPs 130 and 134, for four link connections. Since ITC cluster 106 overlaps LATA 102, ALCs 122 and 124 are also connected by four A-links 128 to BOC STPs 136 and 140.

In contrast, cluster 108 does not include any ALCs. As such, each of SSPs 164, 166, 168 and 170 connects directly to BOC STPs 158 and 160, via links 162. Consequently, the owner of ITC cluster 108 is charged by the BOC for eight connections for only four SSPs. Thus, cluster 108 would be substantially more costly to operate on a per SSP connection basis than cluster 106 due to the increased BOC connection charges.

Each BOC operated LATA contains two STPs arranged in what is known in the art as a mated pair. To provide a fault tolerant, redundant network, STPs are utilized in so-called mated pairs. Specifically, LATA 102 contains mated pair STPs 136 and 140; LATA 103 contains mated pair STPs 130 and 134; and LATA 104 contains mated pair STPs 158 and 160. Additionally, long distance carrier network 105 contains mated pair STPs 146 and 148 which provide a connective path(s) between the LATAs. Functionally, only one STP in each LATA and in the long distance network is necessary to communicate signaling messages between SSPs within different LATAs, e.g., from SSP 164 to SSP 120. However, by using mated pairs, a particular STP can be taken off-line for maintenance without disrupting signaling message traffic flow. Additionally, equipment failure at a particular STP does not cause a disruption in message flow.

To facilitate such redundancy, each STP connects to other STPs within network 100 via multiple signaling paths. For example, cross-links 132, known a C-links, connect STP 130 to STP 134 to form a mated pair of STPs. Similarly, C-links 138 connect STP 136 to STP 140. Other C-links include links 144 and 156. Additionally, so-called B/D-quad links 150 and 151 respectively connect STP 146 to STP 158 and STP 148 to STP 160. Similar B/D-quad links connect STP 130 to STP 146, STP 134 to STP 148, STP 136 to STP 146 and STP 140 to STP 148. Furthermore, so-called B/D-quad links 152 and 154 respectively connect STP 146 to STP 160 and STP 148 to STP 158. STPs 130, 134, 146, 148, 136 and 140 are similarly interconnected with B/D-quad links. A-links 128 connect mated-pair STPs 130 and 134 and 136 and 140 to ALC mated pair 122 and 124. Two signaling paths connect each SSP in cluster 108 to mated pair STPs 158 and 160. As such, each and every signaling path through network 100 has at least one corresponding redundant path.

2. Signaling Message Utilization a. Call Routing

With the above illustrative network topology in mind, how this network is used to control the routing of a telephone call is now discussed. Specifically, when a caller places a telephone call from one station to another station, signaling network 100 facilitates the voice connection between the two stations. As is well known in the art, to build a communication path between stations, signaling network 100 routes the call through a communications network (not shown) by activating switches within each SS7 node in the signaling network. As such, network 100 must create a path for the signaling messages from the SSP (originating SSP) to which a calling station is connected to the SSP (destination SSP) to which a receiving station is connected. In practice, path definition is accomplished by successively passing a signaling message generated in the originating SSP from one SS7 node in network 100 to another SS7 node until the message reaches the destination SSP. As the message is passed through the signaling network, switches within each node are activated to produce a communication path for the communication signals. An SS7 node is defined as a point in the network where multiple signaling paths (and communication paths) join to facilitate switching of the signaling path (and communication path). An SS7 node is also known in the art as a signaling point. As such, each node in network 100 is either an STP or SSP. Other types of nodes may form a portion of network 100; however, these types of nodes do not form any part of the invention nor do they interact with any part of the invention. As such, these other nodes will not be discussed hereinafter.

For example, when a caller at station 117 connected to SSP 118 desires to communicate with station 167 connected to SSP 168, the caller dials a 10-digit destination number (DN) typically having the form NPA-NXX-XXXX. Where NPA is the 3-digit area code number, NXX is the 3-digit prefix number, and XXXX is the 4-digit station number. After the number is dialed, SSP 118 generates a signaling message containing this number. The signaling message has a format that is compatible with the SS7 protocol. The specific format of the message is discussed in detail below. Initially, SSP 118 addresses the message to ALC 124 which is typically a tandem. The specific ALC used is determined by a conventional load sharing algorithm (the details of which are not relevant here) that is executed by a computer within the SSP. The tandem re-addresses the message to a tandem within the LDC via an associated BOC STP, e.g., either BOC STP 136 or 140. The particular STP used is defined by a conventional routing algorithm (also not relevant here). The STPs, for example, STP 136 and 148, passes the message to a tandem (not shown) within the LDC. As is well known in the art, the tandem performs an address translation upon the destination number contained in the message, then sends the message back to the STP, e.g., STP 148. As exemplified, STP 148 would forward the message to other STPs, for example, via STPs 146, 158 and 160, and then onto SSP 168, i.e., the destination SSP. The particular path taken by the message through the SS7 network depends on link availability, message traffic and traffic congestion. The details of message transfer between SSPs located in different ITC clusters are not necessary to understand the present invention; therefore, such details are not presented herein. As the signaling message passes through the signaling network, the message, depending on its type, causes the various SS7 nodes to perform certain tasks. For example, the message may cause each node to form a communication link by interconnecting a series of communications pathways such that a calling station connected to SSP 118 can communicate with a receiving station connected to SSP 168.

b. Other Services

Signaling messages in a signaling network are also used to provide special services that require information to be transmitted between SSPs. One such special service is a custom local area signaling service (CLASS) (hereinafter referred to as a CLASS service).

To utilize one of the CLASS services, a telephone user merely depresses a particular key combination on their telephone. A particular key combination requests a specific CLASS service, such as automatic recall, automatic redial or screening list editing. The SSP to which that particular station, for example, station 117, is connected recognizes the key combination and performs the service requested. For example, a certain key combination may initiate an automatic callback service. Generally speaking, this service dials the telephone number of the last station called by the caller.

In operation, when a caller dials a telephone number and that number is "busy", i.e., the called station is "off-hook", the caller may request the automatic callback service by depressing a touch-tone key combination, e.g., "*69". In response, the SSP (originating SSP 118) to which calling station 117 is connected produces a CLASS message. This message will invoke the automatic callback service within an SSP to which the message is addressed. This message is routed to the SSP (destination SSP 168) connected to called station 167. For example, if calling station 117 is connected to SSP 118, network 100 may illustratively route the CLASS message through ALC 124, BOC STP 140, LDC STP 146, BOC STP 158 and, finally, to SSP 168.

To facilitate message routing, each message generated by SSP 118 is initially addressed to a BOC STP, for example, BOC STP 140. The message sent to the STP contains an address of the originating SSP, a telephone number for the station requesting the CLASS service, and the telephone number of the called station (destination number). Once received by STP 140, that STP translates the destination number into a destination point code for the SSP connected to that station, e.g., a destination point code of SSP 168. The STP then sends the message through the network to SSP 168. Each message generated by an SSP in an ITC cluster must be translated by an STP to facilitate proper routing of the message through the network.

The CLASS message, once received by SSP 168, informs SSP 168 that a caller has requested the automatic callback service. Additionally, the CLASS message includes the address of the originating SSP and the telephone number of the calling station connected thereto which requested the CLASS service. The destination SSP then sends a CLASS message containing an acknowledgment back to the originating SSP to inform the latter SSP that the automatic callback service has been initiated. Since the destination SSP presently knows the address of the originating SSP, the return message is addressed to the originating SSP without translation. Consequently, this return message does not need translating by a BOC STP. After the message is sent from SSP 168, an automatic callback algorithm executes on a computer system in the destination SSP. This algorithm monitors a station line to the called station for an "on-hook" signal indicating that the called party has hung up their telephone, i.e., the line is no longer busy. When the on-hook signal occurs, the destination SSP sends a CLASS message to the originating SSP to inform that SSP that the called line is no longer busy. In response to this CLASS message, the originating SSP automatically dials the called number and notifies the caller that the number has been dialed by ringing the caller telephone using a predefined ring pattern. The caller may then pick up the telephone handset and await the called party to answer the telephone.

Though the foregoing example discussed the operation of the signaling network during execution of the automatic callback CLASS service, those skilled in the art will realize that many other CLASS services are available including automatic redial and screening list editing. These other CLASS services and their operation are well known in the art; therefore, the foregoing discussion of the automatic callback service will suffice as illustrative of operation of other CLASS services.

B. A TECHNIQUE FOR IMPROVING SIGNALING MESSAGE ROUTING

The foregoing example illustrated the manner in which a CLASS message is propagated from an originating SSP to a destination SSP via the SS7 network. Presently, an STP must always be utilized to translate a destination number into an address of an SS7 node to which the CLASS message is to be forwarded. Consequently, even if a call is placed between SSPs within a cluster, so-called intra-cluster signaling, the message must be sent to an STP outside the cluster for translation. The translation will determine that the destination SSP is within the cluster that originated the message and the STP performing the translation will address the message for that destination SSP.

The present inventive technique advantageously eliminates the need to access an STP for translating intra-cluster CLASS messages. In accordance with the inventive technique, a translation is accomplished within an SSP which originates the CLASS message (originating SSP) to determine if the message need be passed to an STP for further translation or routed directly to an intra-cluster destination SSP. The present inventive technique only functions within clusters that utilize ALCs such as cluster 106, i.e., SSP clusters that contain connective paths between SSPs within the cluster. Since cluster 108 does not utilize ALCs, the inventive technique is not applicable to that cluster.

Specifically, through use of the invention, an originating SSP uses the destination number to access an internal database within that SSP to determine whether an intra-cluster translation can be accomplished or not. More specifically, from a given destination number, the database generates one of the following: (1) an indication that the destination number must be translated by an STP, or (2) an indication that the destination number can be validly translated to an SS7 node address within the originating SSP. From either of these indications, the originating SSP routes the message accordingly: for a destination number requiring STP translation, to an STP connected to the ALC; alternatively, for a local translation, to an SSP within the cluster. The specific operation of the inventive technique is described in detail below. To facilitate reader understanding, the following description discusses the invention in the context of CLASS message routing; however, those skilled in the art will readily realize the applicability of the invention to other types of signaling messages.

Figure 2:
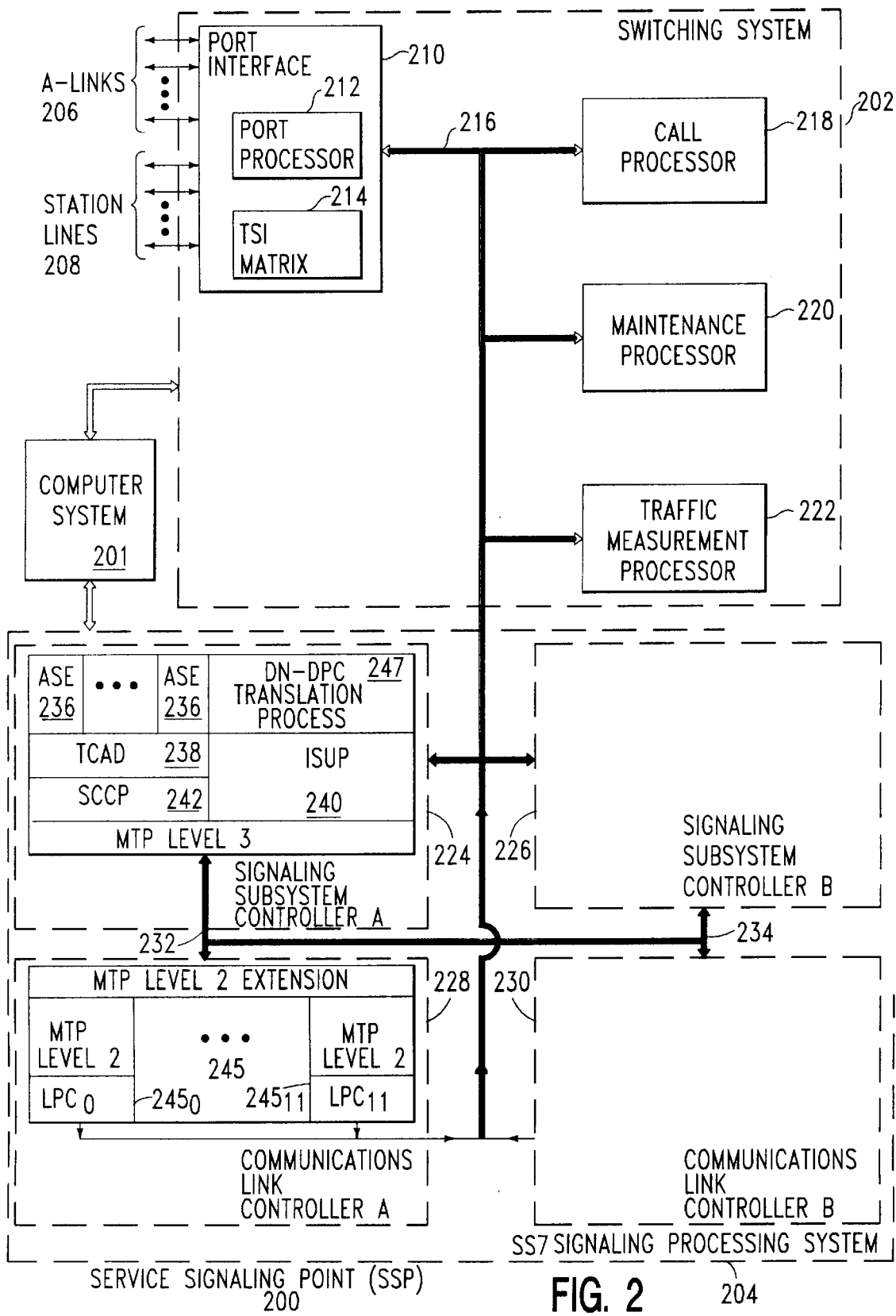
FIG. 2 depicts a high level block diagram of SSP 200 including the portions therein for implementing the inventive technique within a signaling network.

FIG. 2 depicts a block diagram of SSP 200 which provides a capability for intra-cluster CLASS message routing without STP access. SSP 200 contains switching system 202, SS7 signaling processing system 204 and computer system 201. Computer system 201 controls the entire SSP, i.e., both switching system 202 and SS7 signaling processing system 204. Switching system 202 functions to properly route both communications signals, e.g., in-band signals, and signaling messages to/from various A-links and station lines. In particular, switching system 202 activates switches that connect the pathways for both signaling messages and communications signals. Typically, the switches in the communications network are activated in response to signaling messages received by the SSP from the signaling network. The SS7 signaling processing system generates the proper message protocol for all the signaling messages generated by the SSP. These messages are then sent to the switching system for appropriate routing to an A-link.

Switching system 202 contains port interface 210 for connecting switching system 202 to A-links 206 and station lines 208. Port interface 210 contains port processor 212 and time slot interchange (TSI) matrix 214. Additionally, switching system 202 contains call processor 218, maintenance processor 220 and traffic measurement processor 222, which are each interconnected, via bus 216, with one another and with port interface 210. The various components and processors which comprise switching system 202 are well known in the art and these will not be discussed in any further detail. Additionally, the process used to route communications signals and signaling messages amongst the various ports is also well known in the art.

SS7 signaling processing system 204 contains a pair of signaling subsystem controllers (SSC) 224 and 226 (also denoted as SSCs A and B) and a pair of communication link controllers (CLCs) 228 and 230 (also denoted as CLCs A and B). Bus 232 connects SSC 224, to both CLCs 228 and 230. Similarly, bus 234 connects SSC 226, to both CLCs 228 and 230. The two A and two B controllers interact through port interface 210 with various ones of A-links 206. All these controllers, operating cooperatively, generate messages having the proper protocol to achieve accurate routing of these messages to their respective destinations. Generally, SSC A and SSC B function identically and form redundant controllers. Typically, while SSC A is active, SSC B is in a standby mode and vice versa. Additionally, CLC A and CLC B function identically, though each CLC connects to a different set of A-links, via port interface 210. Because the A and B controllers function identically, the following discussion of the operation of these controllers focuses upon SSC A and CLC A (hereinafter referred to as the "A controllers").

Before proceeding with a specific discussion of the A controllers, a high-level overview of the basic conventional functioning of an SS7 node, i.e., SSP 200, in an SS7 network is provided to familiarize the reader with various concepts and terminology.

Generally, a fundamental principle of an SS7 network is a division of various functions accomplished by the network into separate modules (i.e., so-called "parts") or entities. In particular, a given node in the network contains a message transfer part (MTP) and various "user" parts. The MTP serves as a transport system to provide reliable transfer of signaling messages between user parts. In this context, the user parts are any functional entity that utilizes the transport capability provided by the MTP. As a further separation, the function of the MTP is separated into three functional levels, i.e., levels 1, 2, and 3. Higher levels, e.g., 4 and up, are typically associated with various user parts.

Figure 3:
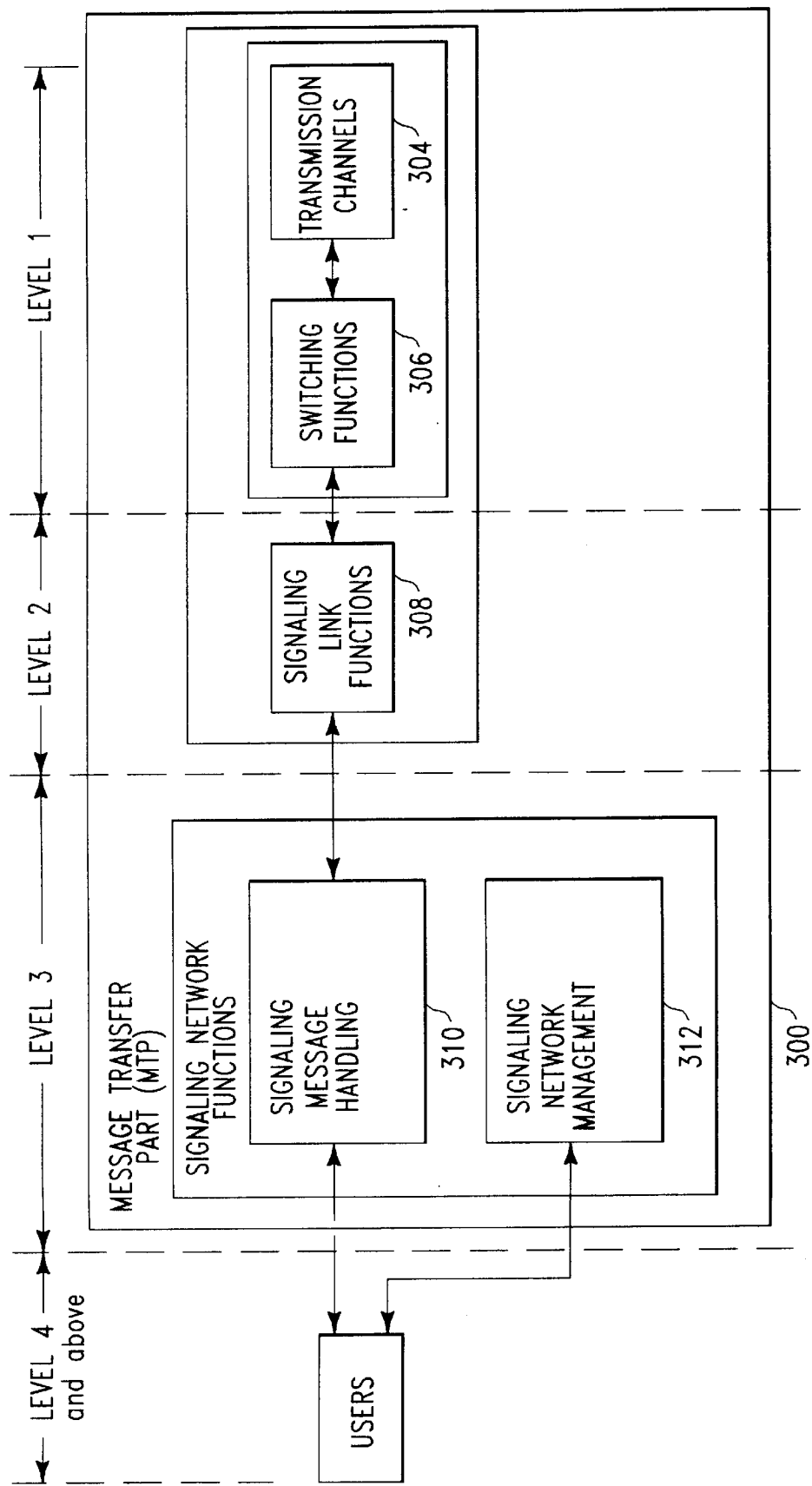
FIG. 3 depicts a functional block diagram of message transfer part (MTP) 300 of SS7 signaling processing system 204.

FIG. 3 depicts a model of the three functional levels of MTP 300. Level 1 defines physical, electrical and functional characteristics of a signaling link and techniques to access a signaling link. These functions of level 1 are symbolized by switching functions block 306 and transmission channels block 304. In a digital environment, 56 and 64 Kbps digital paths, e.g., A-links, are normally used for the signaling links that form the transmission channels. A particular routing of a signaling message to a specific digital path, i.e., switching function, is provided by the switching system within the SSP. Thus, the switching system can be thought of as a portion of level 1.

Level 2 defines functions and procedures for, and relating to, the transfer of signaling messages over a single signaling link. These functions are symbolized by signaling link functions block 308. Generally, level 2 transfers a signaling message generated by the higher levels, e.g. level 3 and above, over a signaling link in variable length units or messages. A signaling message is an assembly of information, defined at level 3 or higher, pertaining to a call, a management transaction and the like. Each message contains service information including a service indicator identifying the user of the MTP, an indicator specifying whether the message relates to international or national service, and a message priority indicator. Additionally, a message contains so-called "signaling information" which includes actual user or service information—such as one or more telephone or data call control signals, management and maintenance information, and the like—and information identifying the type and format of the message. The message also includes a label that provides information enabling the message to be routed, by level 3 functions upon reception at a destination SSP, toward the destination of the particular user to whom the message relates. On each individual signaling link, each message is packed into a message signaling unit (MSU), which also includes transfer control information related to level 2 functions of the link. Details of an MSU format are presented below.

Level 3 defines those transport functions and procedures common to, and independent of, the operation of individual signaling links. These functions fall into two categories: (1) signaling message handling functions (symbolized by block 310) which, during an actual message transfer, direct the signaling message to the proper signaling link for subsequent transmission onward or to a higher level function for local processing, and (2) signaling network management functions (symbolized by block 312) which, based on predetermined data and information about the status of the SS7 signaling network, control current message routing and configuration of signaling network facilities.

Level 4 and above consist of different users of the MTP. Each user defines the functions and procedures of the signaling network that are required by that user. The invention, and specifically the destination number to destination point code translation associated therewith, resides within the user level. The particular user levels which are applicable to the invention are discussed below.

Now, returning to FIG. 2, SSC A 224 provides level 3 operations. The various conventional operations and functions performed by the SSC are further divided into application service elements (ASE) 236, transaction capabilities application part (TCAP) 238, integrated services digital network (ISDN) user part (ISUP) 240, and signaling connection control part (SCCP) 242. ASE, TCAP, ISUP and SCCP form various user parts which utilize the MTP transport system to route signaling messages to various signaling links.

Specifically, TCAP 238 provides special message handling functions known as "transaction capabilities". The transaction capabilities presently available include: (1) number services, e.g., 800-number services; (2) calling card services; (3) screening list editing; (4) mobile subscriber location service; (5) automatic callback/automatic redial; and (6) operations and maintenance procedures. Each transaction capability is implemented by one of the application service elements (ASE) $236_1$, $236_2$, . . . , $236_n$. TCAP 238, using one or more ASE, generates CLASS messages, i.e., signaling messages for implementing transaction capabilities such as automatic callback, automatic redial and screening list editing above.

Additionally, ISUP 240 defines a protocol through which call processing programs in different exchanges communicate. Such communication facilitates trunk connections to complete inter-exchange calls.

SCCP 242 transfers non-circuit related information, i.e., information not directly related to routing a call and completing a communication circuit, between SSPs and STPs. In particular, the SCCP controls routing of CLASS messages. A detailed description concerning interaction of the invention with the SCCP is provided below.

CLC A 228 provides the MTP level 1 and level 2 operations for messages generated by SSC A 224. Specifically, CLC A contains MTP level 2 extension 244 which forms an interface between individual link protocol controllers (LPC) $245_0$, $246_1$, . . . , $245_{11}$ (cumulatively referred to as 245) and bus 232. Each LPC forms an interface, via bus 216 and port interface 210, to a particular A-link, within A-links 206. Each such interface performs an MTP level 1 function. In this manner, signaling messages produced by the various user parts within SSC A 224 are sent to CLC A 228 and CLC B 230. Within the CLCs, the messages are properly routed to an appropriate LPC (an MTP level 2 function). The appropriate LPC routes the message to an associated A-link for transmission through the SS7 network (an MTP level 1 function). Upon reception of a message from an A-link, the associated LPC passes the received message to a corresponding CLC and onto an associated SSC. The specific function of LPC 245 and their interface to A-links 206 is well known in the art and does not form a portion of the invention.

A specific embodiment of the invention is contained within SSC 224. The inventive technique, embodied within a software program executing upon computer 201, translates a destination number, i.e., a number called from a telephone, into a destination point code. Computer 201 is illustratively a model 68020 processor, manufactured by Motorola Semiconductor Products of Phoenix, Ariz. Though portions of signaling processing system 204 are implemented in software, including the invention, and are executed on computer 201, these software systems are depicted separate from the computer to facilitate understanding of the various sub-systems which comprise system 204.

Generally, the SSC translates the first six digits of a ten-digit destination number (DN) into a destination point code (DPC). This translation is hereinafter referred to as a DN-DPC translation process. This process is symbolized by block 247. Subsequently, process 247 determines if the DPC produced by the technique indicates that the destination for the CLASS message generated by TCAP 238 should be routed to an intra-cluster SSP address or an STP address.

Figure 4:
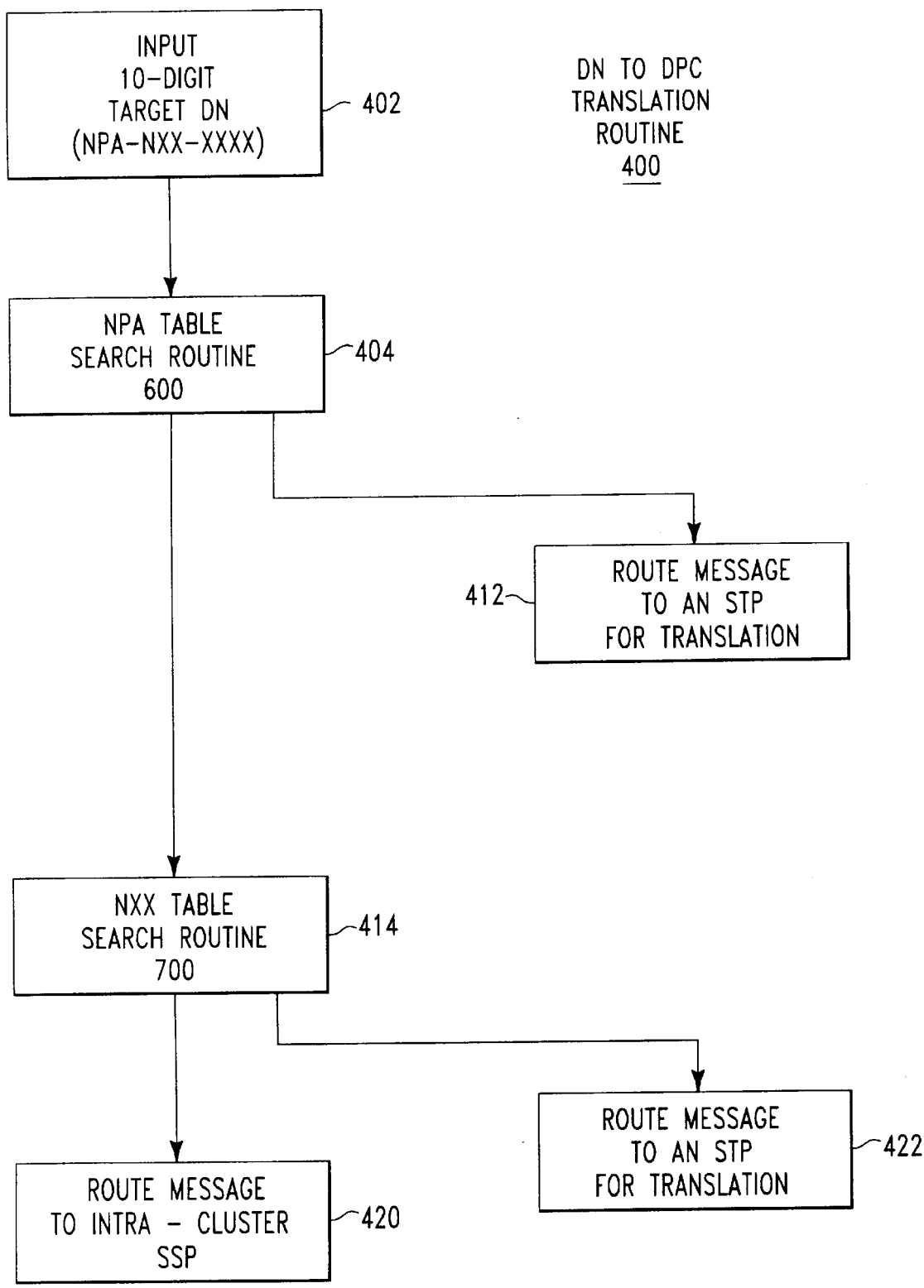
FIG. 4 depicts a high level flow chart of destination number (DN) to destination point code (DPC) translation process 400 as executed on computer system 201 within a central office.

FIG. 4 depicts a high level flow chart of destination number (DN) to destination point code (DPC) translation routine 400 for performing DN to DPC translation using computer 201 shown in FIG. 2. In general, routine 400 translates a ten-digit destination number, known as a target destination number, for a present call into a destination point code. The resulting destination point code is then inserted into a signaling message unit (MSU). Thereafter, the SSP, e.g., an SSP such as that shown in FIG. 2, properly routes the message to the destination addressed by the DPC.

As shown, routine 400 begins at step 402 where the call processor (218 in FIG. 2) supplies a 10-digit target destination number, having been dialed by a caller, to the SSC. This destination number is supplied to the SSC after the caller has requested a CLASS service. The 10-digit number has the standard form of NPA-NXX-XXXX, where NPA is a three digit number corresponding to the numbering plan area (NPA), commonly known as an area code, NXX is a three digit office code, and XXXX is a four digit number corresponding to a destination station (telephone) number.

At step 404, routine 400 executes NPA table search routine 600. This routine searches a table of NPA numbers to facilitate generation of a message signaling unit (MSU) for a CLASS message and routing of the MSU to an appropriate destination. The specific details of NPA table search routine 600 are discussed below with respect to FIG. 6. As a result of the NPA table search in step 404 of FIG. 4, routine 400 performs one of two operations.

First, if the NPA table search routine cannot translate the destination number into a destination point code, then, at step 412, the MSU is routed to an STP for translation to a destination address outside of the present SSP cluster.

Oftentimes, and secondly, both the NPA numbers and the NXX numbers are used to determine whether the call requires an intra-cluster message routing or routing to an STP. Typically, NPA table search routine 600 is supplemented, at step 414, with NXX table search routine 700. NXX table search routine 700 searches a table of NXX numbers associated with the NPA number used to address NPA table search routine 600. From NXX table search routine 700, step 414 determines whether the MSU should be routed to an intra-cluster destination SSP (step 420) or an STP (step 422). At step 420, an MSU is generated, addressed and routed to a destination SSP within the local SSP cluster. Alternatively, at step 422, an MSU is generated, addressed and routed to an STP.

Before discussing specific details of NPA table search routine 600 and NXX table search routine 700 and to enhance subsequent reader understanding of these routines, an overview of a conventional basic format of an MSU used to route signaling messages through an SS7 network is provided.

Figure 5:
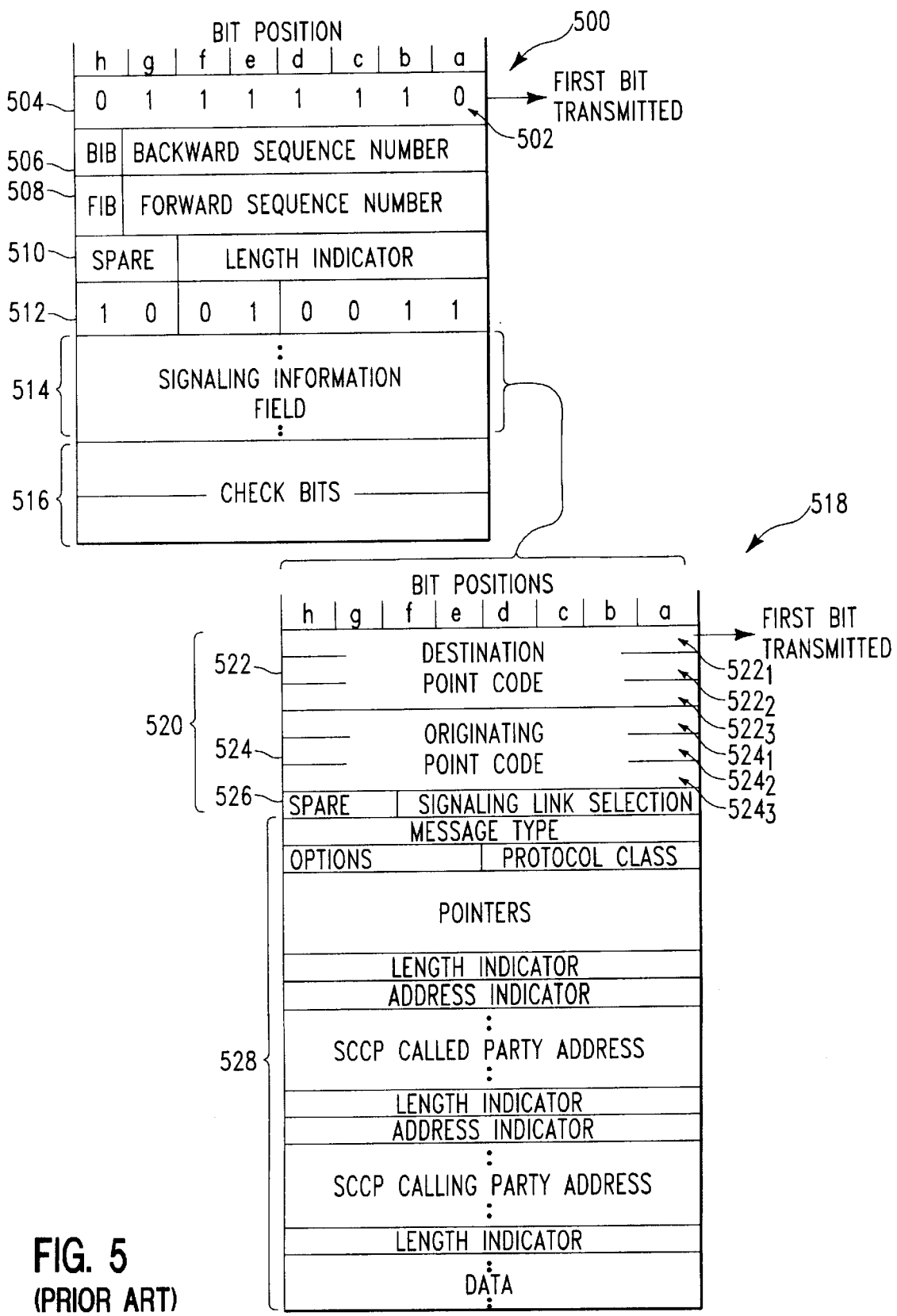
FIG. 5 depicts a conventional protocol for SS7 message signaling unit (MSU) 500.

FIG. 5 depicts the basic MSU format. MSU message 500 contains a series of "octets" of data bits. Though the octets are transmitted through the SS7 network as a serial bit stream, for simplicity, FIG. 5 depicts the octets as a stack of 8-bit rows. Each row represents a single octet. Bit 502 in MSU 500, a bit in position "a" of row 504, is the first bit of the MSU transmitted through the SS7 network. The remaining bits form the serial bit stream by being selected in a predefined order from right to left, e.g., from bit position "a" through bit position "h", in any given row and from top to bottom, i.e., from row 504 through row 516, through the series of octets.

Row 504 contains a unique 8-bit pattern which delimits the MSU. To avoid misinterpreting information octets within the MSU as the delimiting pattern, a "0" is inserted into the octet bit streams after every sequence of five consecutive "1" bits that are not part of a delimiting pattern. These "0" bits are deleted at the node that receives the MSU.

Row 506 contains a backward indicator bit (BIB) and a backward sequence number which are used in conjunction with a forward indicator bit (FIB) and a forward sequence number, in row 508, to provide MSU sequence control and acknowledgment functions.

Row 510 includes a length indicator which indicates the number of octets (3–63) contained in the signaling information field (row 514).

Row 512 contains a service message octet.

Row 516 contains check bits for error detection. The check bits form a 16-bit cyclic redundancy code.

Row 514 contains a signaling information field which is a variable length field that carries the information generated by the user part, specifically, information generated by the signaling connection control part (SCCP). Details of the contents of the signaling information field are provided below.

One particular type of information contained in the signaling information field of row 514 is SCCP message 518. Generally, SCCP message 518 contains message addressing information to enable the SS7 network to properly route the MSU to a destination node and message information that is used by the destination node to control call routing through that node or to request the destination node to perform a specific task.

SCCP message 518 contains message routing information in area 520 and task information in area 528. Area 520 specifically includes a series of octets represented by rows 522, 524 and 526. Row 522 contains an SS7 address for a recipient node of the MSU (destination point code). The SS7 address contains three fields each having 8 bits. The first field contains 8-bit network code $522_1$, the second field contains 8-bit cluster code $522_2$ and the third field contains 8-bit member code $522_3$. Row 524 contains an SS7 address (three 8-bit fields $524_1$, $524_2$ and $524_3$) for a node which sends the MSU (originating point code). Row 526 contains a signaling link selection (SLS) code that selects a particular signaling link for transmission of the MSU. Area 528 contains a series of octets that contain information used by the recipient node to perform a specific task. The specific information varies depending upon the type of recipient node, e.g., an SSP or an STP.

In a conventional network arrangement of SSPs, the destination point code (DPC), used in every CLASS message MSU generated by an SSP, is typically that of an STP. Thus, the SSP routes each and every CLASS message MSU to the STP. That STP translates the target destination number (SCCP called party address), contained in area 528 of MSU 500, into a destination point code for further routing of the MSU. For example, a call, having a target destination number within the SSP cluster that originated the call, is first processed by an SSP to which the calling station is connected. To properly route the call, the SCCP generates an SCCP message having the target destination number within area 528 of an MSU. The DPC of the MSU is set to that of an STP, typically, a member code equal to "00000000". The SSP sends, via an A-link specified in the SLS field of the MSU, the MSU to the STP. The STP translates the target destination number carried by the MSU into a new DPC. The STP then produces an MSU having a new destination point code which corresponds to a destination SS7 node. The STP sends the new MSU to the destination SS7 node via another A-link. The destination SS7 node uses the information in area 528 of the MSU to accomplish a CLASS function.

The conventional process, exemplified in the forgoing discussion, routes signaling information for every CLASS message by accessing an STP. The inventive technique does not require access to an STP to accomplish message translation. The inventive technique, as previously discussed, appropriately translates, within the SSP, the target destination number associated with a CLASS message into a destination point code. Thus, access to an STP is only necessary to translate a non-CLASS message, e.g., a database service message such as 800-service calls and line information data base services, and a CLASS message which must be routed to an SS7 node outside of the cluster which generated the message.

Having discussed the format of an MSU and its role in DN-DPC translation, the details of the DN to DPC translation process are now addressed. In particular, the NPA and NXX table search routines 600 and 700 will be discussed.

Figure 6:
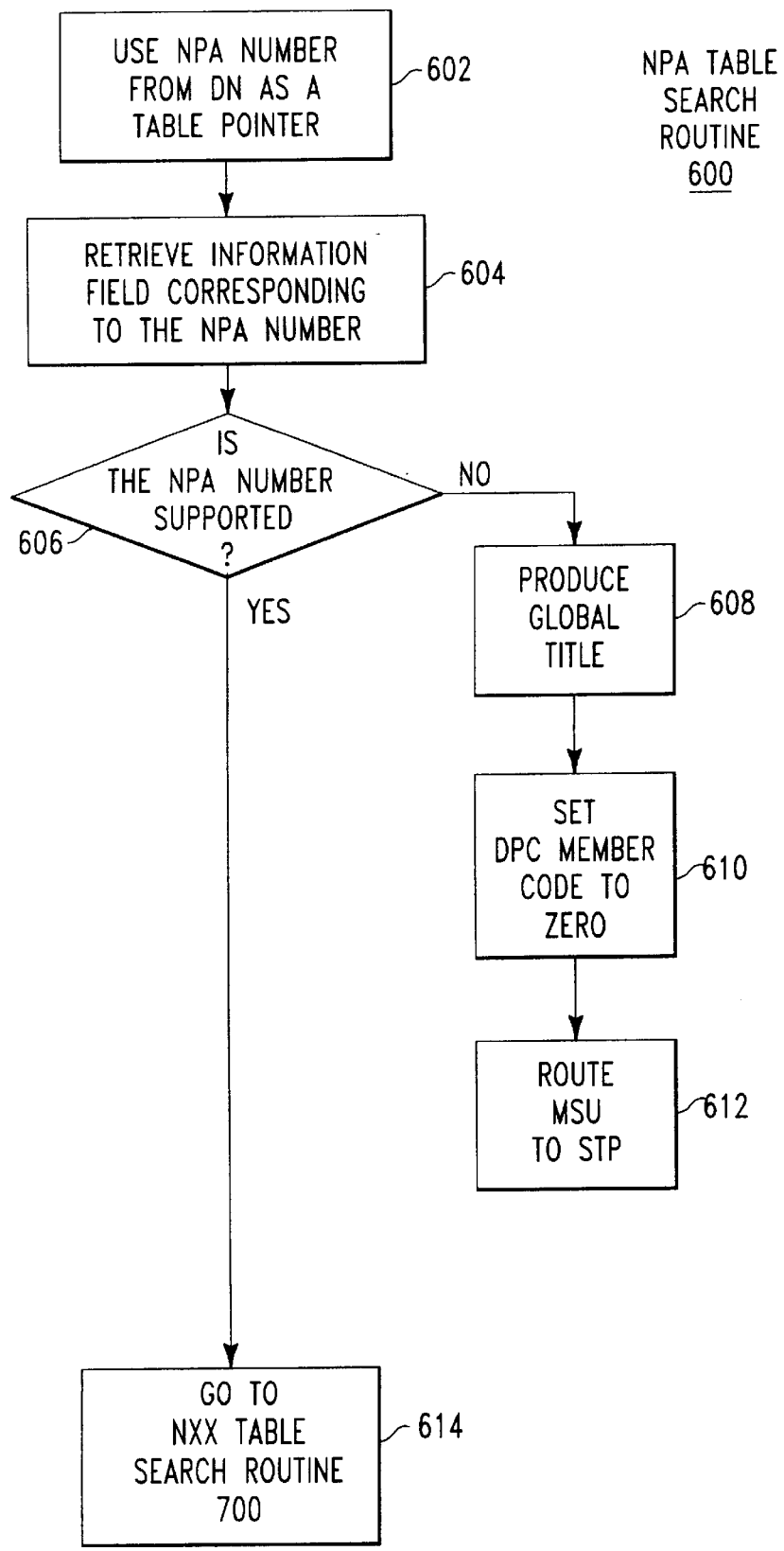
FIG. 6 depicts a flow chart of NPA table search routine 600 as executed on computer system 201 within a central office.

FIG. 6 depicts a detailed flow chart of NPA table search routine 600 executed in computer 201 of FIG. 2. As briefly discussed above, routine 600 searches an NPA table to determine an appropriate destination point code for insertion into an MSU previously generated by the TCAP. The appropriate destination point code produced by the invention is provided to the SCCP for inclusion in the SCCP message. This SCCP message is then included in a CLASS message produced by the TCAP. The destination point code used is defined by either the NPA number within the target destination number alone or the NPA number in conjunction with the NXX number within the target destination number. NPA table search routine 600 determines whether a destination point code can be found using only the NPA table. If the destination point code cannot be found using only the NPA table, NPA table search routine 600 calls NXX table search routine 700 (depicted in FIG. 7 and discussed in detail below) to define the destination point code.

Specifically, at step 602 (shown in FIG. 6), routine 600 uses an NPA number of the target destination number, i.e., the first three digits of a 10-digit telephone number, as a pointer into a table of NPA numbers ranging from "200" through "999". The pointer indexes a particular field of information within the NPA table. The information field is retrieved from the table by step 604. The SS7 signaling processing system uses this information field to address the MSU that will be generated for the present CLASS message.

At step 606, routine 600 queries whether the information field indicates that this SSP supports the dialed NPA number. A negative response indicates that a so-called global title translation must be conducted to determine an appropriate destination point code. An STP must be used to perform a global title translation. Accordingly, execution of routine 600 proceeds along the NO path, emanating from decision step 606, to step 608. Thus, step 608, when executed, produces a global title within an SCCP message containing the target destination number. The SS7 signaling processing system inserts the SCCP message containing the global title into a CLASS message MSU. Additionally, at step 610, the destination point code for this MSU is set to the address of a particular STP. As such, the MSU is routed, at step 612, to the STP. As in a conventional SS7 network, the STP performs an appropriate translation of the global title and routes the MSU accordingly. As a result, a CLASS message associated with an inter-cluster message is routed properly.

Alternatively, if the NPA table indicates that this SSP does support the dialed NPA, routine 600 proceeds, via the YES path emanating from decision step 606, to step 614. Routine 600 executes, at step 614, NXX table search routine 700 (which is shown in FIG. 7 and discussed in detail below).

Figure 7:
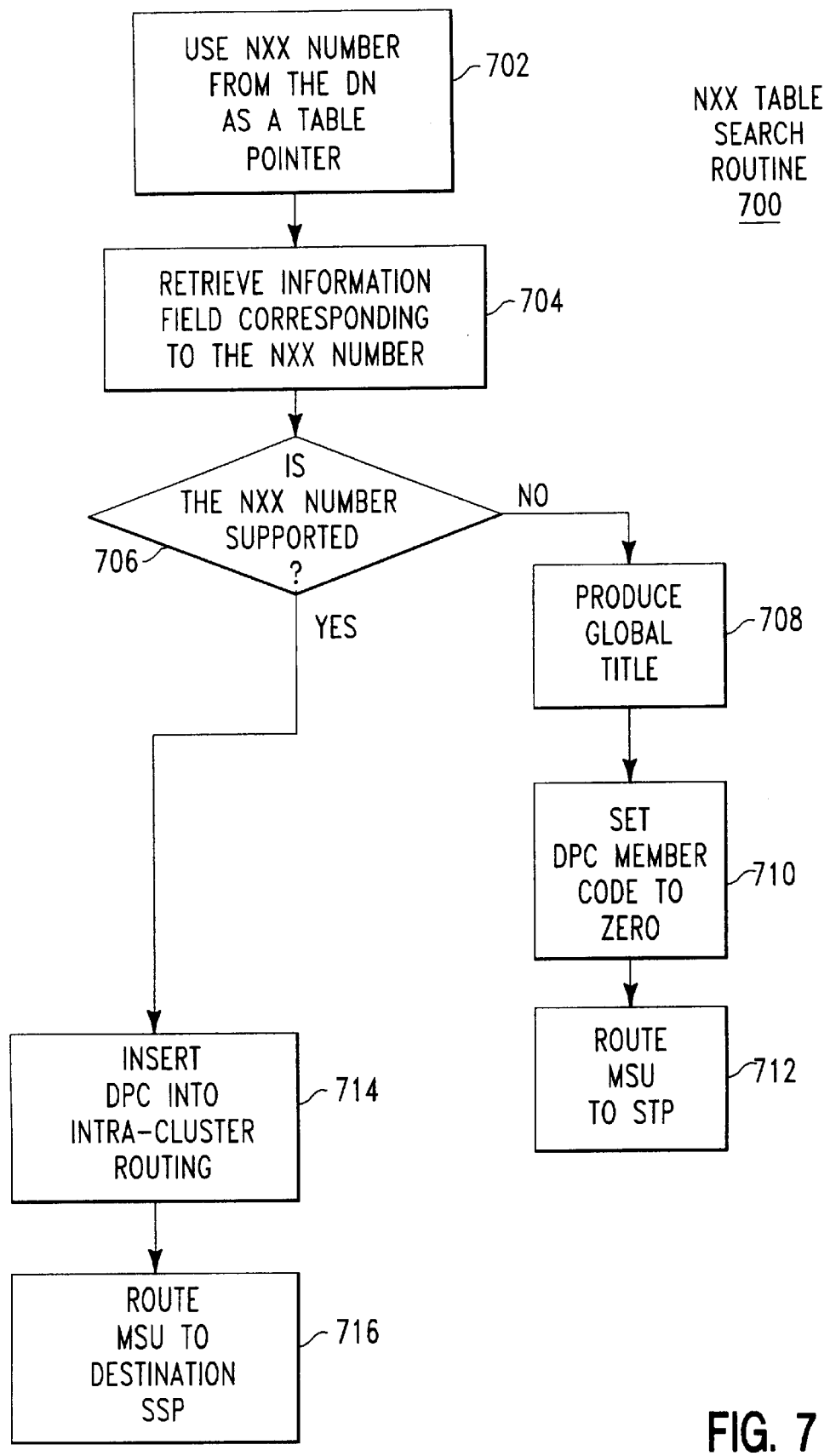
FIG. 7 depicts a flow chart of NXX table search routine 700 as executed on computer system 201 within a central office.

FIG. 7 depicts a detailed flow chart of NXX table search routine 700 executed in computer 201 of FIG. 2. At step 702, the NXX table routine uses the NXX number as a pointer into a table of information fields. The information in each information field, retrieved at step 704, indicates the manner in which the target destination number is translated into a destination point code. Once the contents of the information field is retrieved, the SS7 signaling processing system uses this information field to address the MSU that will be generated for the present CLASS message.

At step 706, routine 700 queries whether the information field indicates that this SSP supports the dialed NXX number. A negative response indicates that a so-called global title translation must be conducted to determine an appropriate destination point code. An STP must be used to perform a global title translation. Accordingly, execution of routine 700 proceeds along the NO path, emanating from decision step 706, to step 708. Thus, step 708, when executed, produces a global title within an SCCP message containing the target destination number. The SS7 signaling processing system inserts the SCCP message containing the global title into a CLASS message MSU. Additionally, at step 710, the destination point code for this MSU is set to the address of a particular STP. As such, the MSU is routed, at step 712, to the STP. As in a conventional SS7 network, the STP performs an appropriate translation of the global title and routes the MSU accordingly. As a result, a CLASS message associated with an inter-cluster message is routed properly.

Alternatively, if the NXX table indicates that this SSP does support the dialed NXX number i.e., a destination point code is contained in the information field, routine 700 proceeds, via the YES path emanating from decision step 706, to step 714. At step 714, that destination point code is inserted into the destination point code field within an SCCP message of a CLASS message MSU. As such, the MSU is then routed, at step 716, to a destination SSP. Hence, as one can now appreciate, by virtue of steps 714 and 716, the originating SSP no longer needs to access an STP for intra-cluster CLASS message routing.

Figure 8:
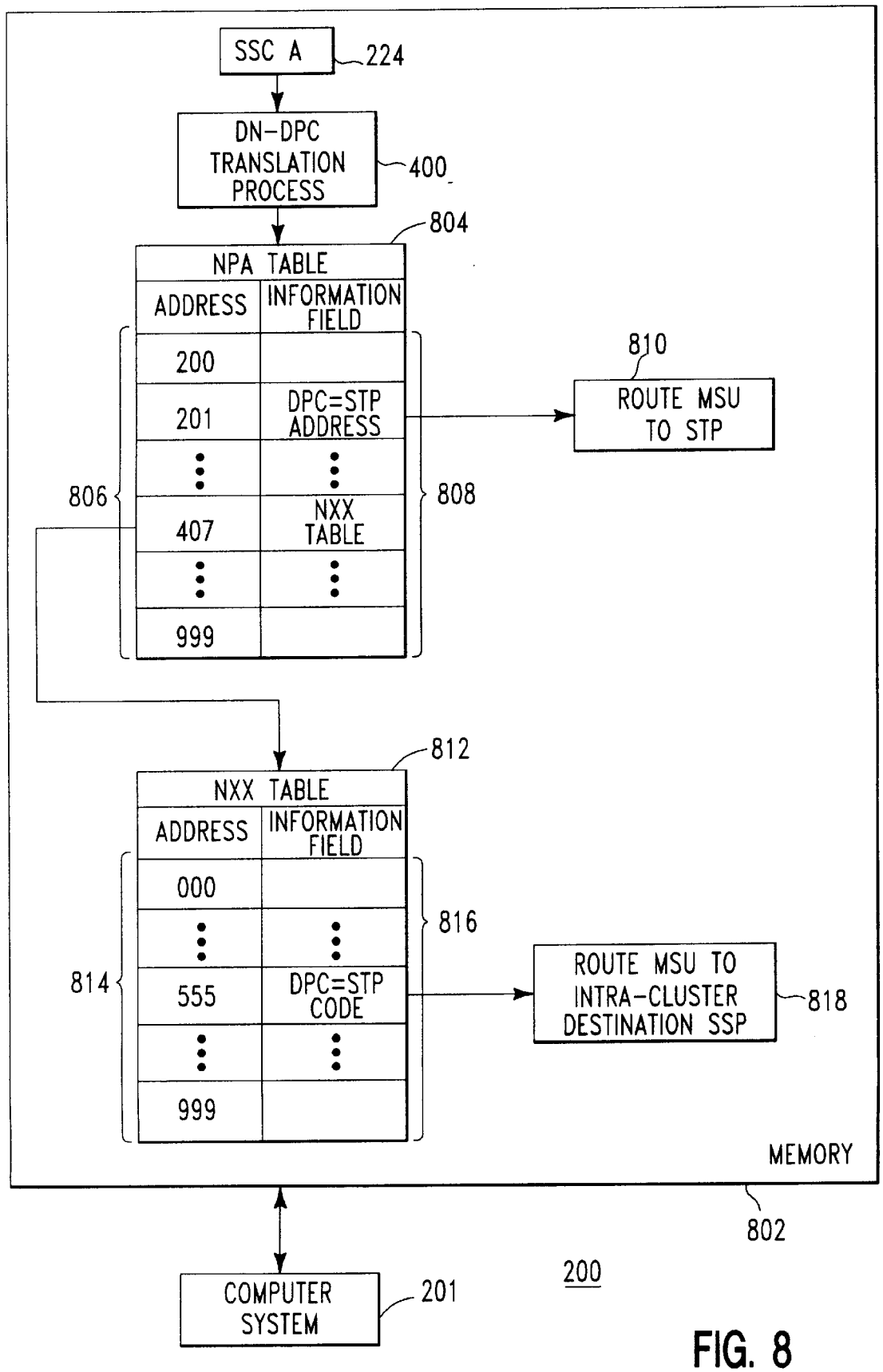
FIG. 8 depicts a functional block diagram of a process executed by computer system 201 to access NPA table 804 and NXX table 812.

FIG. 8 depicts a block diagram of the inventive target destination number translation technique as executed by computer system 201. This block diagram depicts the structure of the NXX table and the NPA table utilized by the inventive technique.

As discussed above, SSP 200 contains computer system 201. This computer system interacts with memory 802. Memory 802 may be a disk drive, semiconductor random access memory (RAM), and the like. Memory 802 stores DN to DPC translation process 400 and its associated tables. Typically, SSC 224 is also stored in memory 802.

When necessary, SSC 224 calls DN to DPC translation routine 400 to facilitate destination number translation. Though the NPA and NXX table search functions are accomplished within routine 400, to clearly depict the interaction of the tables, each table, NPA table 804 and NXX table 812, is shown outside of routine 400. The contents of each table is pre-defined and stored in memory. The pre-defined contents is determined by the NPA and NXX numbers supported by the SSP which contains the specific tables.

Routine 400 accesses NPA table 804 using the target destination number. In particular, the NPA number of the target destination number is used to access information fields 808, within NPA table 804, that correspond to each NPA number (address) 806. If, for example, the target destination number is 201-555-1000, the NPA table is accessed using address "201". Illustratively, NPA "201" is serviced by an SSP that is outside the present cluster. Therefore, the destination number must be translated by an STP. As such, this address illustratively corresponds to an information field containing a member code for a destination point code of an STP. In response, the computer system will execute software, symbolized by block 810, which routes the MSU to that STP.

If the destination number dialed is 407-555-1000, the NPA number, "407", corresponds to an information field containing information that points to NXX table 812. In response, the computer system searches the NXX table using the NXX number of destination number as a table address. As with NPA table 804, NXX table 812 contains addresses 814 corresponding to information fields 816. In the present example, the NXX number (address) is "555" which corresponds to an information field containing a destination point code of a destination SSP. As such, this destination point code is inserted into an MSU for a CLASS message. The computer system then executes, at step 818, MTP level 2 and level 1 software to route the CLASS message to the appropriate destination SSP, i.e., to the intra-cluster SSP associated with the destination point code in the MSU.

As is apparent from the foregoing examples, the invention enables an SSP within a particular SSP cluster to route signaling messages, in particular, CLASS messages, to other SSPs within that cluster without accessing an STP. By avoiding destination number translation in the STP, such a technique improves routing time of CLASS messages from their originating SSP to the destination SSP and reduces network routing complexity.

Although various embodiments which incorporate the teachings of the present invention have been shown and described in detail herein, those skilled in the art can readily devise many other varied embodiments that still incorporate these teachings.

I claim:

1. Circuitry cooperatively arranged with a signaling system for improving the operation of the signaling system, the signaling system being composed of a) a plurality of service switching points (SSPs) forming a network wherein said network of SSPs contains at least one signaling link consolidator such that each of said SSPs in said network is connected to said link consolidator through an associated individual signaling link and b) a signaling transfer point (STP) external to said network and connected to said signaling link consolidator via another signaling link, said circuitry comprising:

means, within each SSP, for producing a signaling message;

means, within an originating SSP, for inserting the STP address and a destination address in said signaling message, said destination address corresponding to a destination SSP, said inserting means further comprising means for translating a portion of a destination number provided by the originating SSP into a destination point code corresponding to said destination SSP or said STP to which the signaling message is to be sent; and means, coupled to said means for producing, for sending said signaling message from said originating SSP to said destination SSP via said link consolidator, the signaling link connected to said originating SSP, and the signaling link connected to said destination SSP, or to said STP via said link consolidator.

2. The circuitry as recited in claim 1 wherein said translating means further comprises:

means for translating, if feasible, a first portion of said destination number into said destination point code corresponding to said STP;

means for requesting further translation if said first portion of said destination number cannot be translated; and means for translating, in response to said request for further translation, a second portion of said destination number into said destination point code corresponding to said destination SSP.

3. The circuitry as recited in claim 2 wherein said destination number has the form NPA-NXX-XXXX, wherein said first portion of the destination number is an NPA number and said second portion of the destination number is an NXX number.

4. The circuitry as recited in claim 3 wherein said first portion translating means further comprises an NPA table which uses the NPA number to determine said destination point code.

5. The circuitry as recited in claim 3 wherein said second portion translating means further comprises an NXX table which uses the NXX number to determine said destination point code.

6. Circuitry cooperatively arranged with a signaling system for improving the operation of the signaling system, the signaling system being composed of a plurality of service switching points (SSPs) forming a network wherein said network of SSPs contains at least one signaling link consolidator such that each of said SSPs in said network is connected to said link consolidator through an associated individual signaling link, said circuitry comprising:

means, within each SSP, for producing a signaling message;

means, within an originating SSP, for inserting a destination address in said signaling message, said destination address corresponding to a destination SSP; and means, coupled to said means for producing, for sending said signaling message from said originating SSP to said destination SSP via said link consolidator, the signaling link connected to said originating SSP, and the signaling link connected to said destination SSP, wherein the signaling system includes a signaling transfer point (STP) external to said network and connected to said signaling link consolidator via another signaling link, wherein said inserting means further comprises means for inserting the STP address in said signaling message, and wherein in said means for sending further comprises means for sending said signaling message to STP, wherein said originating SSP provides a destination number and said means for inserting further comprises means for translating a portion of said destination number into a destination point code of said destination SSP or said STP to which the signaling message is to be sent, wherein said translating means further comprises means for translating, if feasible, a first portion of said destination number to said destination point code corresponding to said STP;

means for requesting further translation if said first portion of said destination number cannot be translated; and means for translating, in response to said request for further translation, a second portion of said destination number into said destination point code corresponding to said destination SSP, wherein said destination number has the form NPA-NXX-XXXX, wherein said first portion of the destination number is an NPA number and said second portion of the destination number is an NXX number, wherein said first portion translating means further comprises:

an NPA table which uses the NPA number to determine said destination point code, means for retrieving an information field from said NPA table;

means for determining from said information field if said NPA number is supported by said NPA table; and means for assigning said destination point code to said signaling message such that said message containing said destination number is routed to said STP if said determining means indicates that said NPA number is not supported by said NPA table.

7. Circuitry cooperatively arranged with a signaling system for improving the operation of the signaling system, the signaling system being composed of a plurality of service switching points (SSPs) forming a network wherein said network of SSPs contains at least one signaling link consolidator such that each of said SSPs in said network is connected to said link consolidator through an associated individual signaling link, said circuitry comprising:

means, within each SSP, for producing a signaling message;

means, within an originating SSP, for inserting a destination address in said signaling message, said destination address corresponding to a destination SSP; and means, coupled to said means for producing, for sending said signaling message from said originating SSP to said destination SSP via said link consolidator, the signaling link connected to said originating SSP, and the signaling link connected to said destination SSP, wherein the signaling system includes a signaling transfer point (STP) external to said network and connected to said signaling link consolidator via another signaling link, wherein said inserting means further comprises means for inserting the STP address in said signaling message, and wherein in said means for sending further comprises means for sending said signaling message to STP, wherein said originating SSP provides a destination number and said means for inserting further comprises means for translating a portion of said destination number into a destination point code of said destination SSP or said STP to which the signaling message is to be sent, wherein said translating means further comprises means for translating, if feasible, a first portion of said destination number to said destination point code corresponding to said STP;

means for requesting further translation if said first portion of said destination number cannot be translated; and means for translating, in response to said request for further translation, a second portion of said destination number into said destination point code corresponding to said destination SSP, wherein said destination number has the form NPA-NXX-XXXX, wherein said first portion of the destination number is an NPA number and said second portion of the destination number is an NXX number, wherein said second portion translating means further comprises:

an NXX table which uses the NXX number to determine said destination point code, means for retrieving an information field from said NXX table;

means for determining from said information field if said NXX number is supported by said NXX table; and means for routing said destination number to said STP if said determining means indicates that said NXX number is not supported by said NXX table;

means for determining if said information field contains said destination point code;

means for inserting said destination point code into said signaling message; and means for routing said signaling message to said destination SSP that corresponds to said destination point code.

8. Circuitry cooperatively arranged with a signaling system for improving the operation of the signaling system, the signaling system being composed of a plurality of service switching points (SSPs) forming a network wherein said network of SSPs contains at least one link consolidator such that each of said SSPs in said network is connected to said link consolidator through an associated individual signaling link, said circuitry comprising:

means, within each SSP, for producing a custom local area signaling service (CLASS) message;

means, within an originating SSP, for inserting a destination address in said message, said destination message corresponding to said destination SSP; and means, coupled to said means for producing, for sending said message from said originating SSP to said destination SSP via said link consolidator, the signaling link connected to said originating SSP, and the signaling link connected to said destination SSP.

9. Circuitry cooperatively arranged with a signaling system for improving the operation of the signaling system, the signaling system being composed of a plurality of service switching points (SSPs) forming a network wherein said network of SSPs has at least one signaling link consolidator such that each of said SSPs in said network is connected to said link consolidator through an associated individual signaling link, a signaling link connects said signaling link consolidator to a signaling transfer point (STP) located outside of the network of SSPs, said circuitry comprising:

means, within each SSP, for producing a custom local area signaling service (CLASS) message;

means, connected to said producing means, for translating a destination number supplied by an originating SSP into a destination point code for either a destination SSP or the STP, said translating means further comprising means for translating, if feasible, a first portion of said destination number into said destination point code corresponding to said STP, means for requesting further translation if said first portion of said destination number cannot be translated, and means for translating in response to said request for further translation, a second portion of said destination number into said destination point code corresponding to said destination SSP;

means for addressing said CLASS message using the destination point code as an address; and means for sending, via at least one signaling link, said CLASS message to either said destination SSP or the STP depending upon the address.

10. The circuitry as recited in claim 9 wherein said destination number has the form NPA-NXX-XXXX, wherein said first portion of the destination number is an NPA number and said second portion of the destination number is an NXX number.

11. The circuitry as recited in claim 10 wherein said first portion translating means further comprises an NPA table which uses the NPA number to determine said destination point code.

12. The circuitry as recited in claim 10 wherein said second portion translating means further comprises an NXX table which uses the NXX number to determine said destination point code.

13. Circuitry cooperatively arranged with a signaling system for improving the operation of the signaling system, the signaling system being composed of a plurality of service switching points (SSPs) forming a network wherein said network of SSPs contains at least one signaling link consolidator such that each of said SSPs in said network is connected to said link consolidator through an associated individual signaling link, a signaling link connects said signaling link consolidator to a signaling transfer point (STP) located outside of the network of SSPs, said circuitry comprising:

means, within each SSP, for producing a custom local area signaling service (CLASS) message;

means, connected to said producing means, for translating a destination number supplied by an originating SSP into a destination point code for either a destination SSP or the STP;

means for addressing said CLASS message using the destination point code as an address; and means for sending, via at least one signaling link, said CLASS message to either said destination SSP or the STP depending upon the address, wherein said translating means further comprises:

means for translating, if feasible, a first portion of said destination number into said destination point code corresponding to said STP;

means for requesting further translation if said first portion of said destination number cannot be translated; and means for translating, in response to said request for further translation, a second portion of said destination number into said destination point code corresponding to said destination SSP, wherein said destination number has the form NPA-NXX-XXXX, wherein said first portion of the destination number is an NPA number and said second portion of the destination number is an NXX number, wherein said first portion translating means further comprises an NPA table which uses the NPA number to determine said destination point code, wherein said first portion translating means further comprises:

means for retrieving an information field from said NPA table;

means for determining from said information field if said NPA number is supported by said NPA table; and means for assigning said destination point code to said message such that said message containing said destination number is routed to said STP if said determining means indicates that said NPA number is not supported by said NPA table.

14. Circuitry cooperatively arranged with a signaling system for improving the operation of the signaling system, the signaling system being composed of a plurality of service switching points (SSPs) forming a network wherein said network of SSPs contains at least one signaling link consolidator such that each of said SSPs in said network is connected to said link consolidator through an associated individual signaling link, a signaling link connects said signaling link consolidator to a signaling transfer point (STP) located outside of the network of SSPs, said circuitry comprising:

means, within each SSP, for producing a custom local area signaling service (CLASS) message;

means, connected to said producing means, for translating a destination number supplied by an originating SSP into a destination point code for either a destination SSP or the STP;

means for addressing said CLASS message using the destination point code as an address; and means for sending, via at least one signaling link, said CLASS message to either said destination SSP or the STP depending upon the address, wherein said translating means further comprises:

means for translating, if feasible, a first portion of said destination number into said destination point code corresponding to said STP;

means for requesting further translation if said first portion of said destination number cannot be translated; and means for translating, in response to said request for further translation, a second portion of said destination number into said destination point code corresponding to said destination SSP, wherein said destination number has the form NPA-NXX-XXXX, wherein said first portion of the destination number is an NPA number and said second portion of the destination number is an NXX number, wherein said second portion translating means further comprises an NXX table which uses the NXX number to determine said destination point code, and wherein said second portion translating means further comprises:

means for retrieving an information field from said NXX table;

means for determining from said information field if said NXX number is supported by said NXX table;

means for routing said destination number to said STP if said determining means indicates that said NXX number is not supported by said NXX table;

means for determining if said information field contains said destination point code;

means for inserting said destination point code into said CLASS message; and means for routing said CLASS message to said destination SSP that corresponds to said destination point code.

15. An improved service switching point (SSP) for each SSP in a network of SSPs interconnected by signaling links to a signaling link consolidator, said improved SSP cooperatively arranged with a signal transfer point (STP) that is external to said network and is connected to said signaling link consolidator via another signaling link, the improved SSP comprising:

means for producing a signaling message;

means for addressing said signaling message to another SSP in said network and to said STP, said addressing means further comprising means for translating a portion of a destination number supplied by said improved SSP into a destination point code for use as an address of said another SSP or said STP to which the signaling message is to be sent and said translating means further comprising means for translating a first portion, if feasible, of said destination number into said destination point code corresponding to said STP, means for requesting further translation if said first portion of said destination number cannot be translated, and means for translating, in response to said request for further translation, a second portion of said destination number into said destination point code corresponding to said another SSP; and means for sending, via said signaling links and said signaling link consolidator, said signaling message to said another SSP or said STP.

16. The improved SSP as recited in claim 15 wherein said destination number has the form NPA-NXX-XXXX, wherein said first portion of the destination number is an NPA number and said second portion of the destination number is an NXX number.

17. The improved SSP as recited in claim 16 wherein said first portion translating means further comprises an NPA table which uses the NPA number to determine said destination point code.

18. The improved SSP as recited in claim 16 wherein said second portion translating means further comprises an NXX table which uses the NXX number to determine said destination point code.

19. An improved service switching point (SSP) for each SSP in a network of SSPs interconnected by signaling links to a signaling link consolidator, wherein said improved SSP is cooperatively arranged with a signal transfer point (STP) external to said network and connected to said signaling link consolidator via another signaling link, the improved SSP comprising:
    means for producing a signaling message;
    means for addressing said signaling message to another SSP in said network; and
    means for sending, via said signaling links and said signaling link consolidator, said signaling message to said another SSP,
    wherein said addressing means further comprises means for addressing said signaling message to said STP and means for translating a portion of a destination number supplied by said improved SSP into a destination point code for use as an address of said another SSP or said STP to which the signaling message is to be sent,
    wherein said translating means further comprises:
        means for translating a first portion, if feasible, of said destination number into said destination point code corresponding to said STP;
        means for requesting further translation if said first portion of said destination number cannot be translated; and
        means for translating, in response to said request for further translation, a second portion of said destination number into said destination point code corresponding to said another SSP,
    wherein said destination number has the form NPA-NXX-XXXX, wherein said first portion of the destination number is an NPA number and said second portion of the destination number is an NXX number,
    wherein said first portion translating means further comprises:
        an NPA table which uses the NPA number to determine said destination point code,
        means for retrieving an information field from said NPA table;
        means for determining from said information field if said NPA number is supported by said NPA table; and
        means for assigning said destination point code to said message such that said message containing said destination number is routed to said STP if said determining means indicates that said NPA number is not supported by said NPA table.

20. An improved service switching point (SSP) for each SSP in a network of SSPs interconnected by signaling links to a signaling link consolidator, wherein said improved SSP is cooperatively arranged with a signal transfer point (STP) external to said network and connected to said signaling link consolidator via another signaling link, the improved SSP comprising:
    means for producing a signaling message;
    means for addressing said signaling message to another SSP in said network; and
    means for sending, via said signaling links and said signaling link consolidator, said signaling message to said another SSP,
    wherein said addressing means further comprises means for addressing said signaling message to said STP and means for translating a portion of a destination number supplied by said improved SSP into a destination point code for use as an address of said another SSP or said STP to which the signaling message is to be sent,
    wherein said translating means further comprises:
        means for translating a first portion, if feasible, of said destination number into said destination point code corresponding to said STP;
        means for requesting further translation if said first portion of said destination number cannot be translated; and
        means for translating, in response to said request for further translation, a second portion of said destination number into said destination point code corresponding to said another SSP,
    wherein said destination number has the form NPA-NXX-XXXX, wherein said first portion of the destination number is an NPA number and said second portion of the destination number is an NXX number,
    wherein said second portion translating means further comprises:
        an NXX table which uses the NXX number to determine said destination point code,
        means for retrieving an information field from said NXX table;
        means for determining from said information field if said NXX number is supported by said NXX table; and
        means for assigning said destination point code to said message such that said message containing said destination number is routed to said STP if said determining means indicates that said NXX number is not supported by said NXX table.

21. An improved service switching point (SSP) for each SSP in a network of SSPs interconnected by signaling links to a link consolidator, the improved SSP comprising:
    means for producing a custom local area signaling service (CLASS) message;
    means for addressing said signaling message to another SSP in said network; and
    means for sending, via said signaling links and said link consolidator, said signaling message to said another SSP.

22. A telecommunications network containing circuitry for providing direct message routing between nodes in the telecommunications network composed of service switching points (SSPs) and a signaling link consolidator, said SSPs being connected to said signaling link consolidator by signaling links, said circuitry being located in a first node of said telecommunications network, said first node providing a destination number of another node, said telecommunications network cooperatively arranged with a signal transfer point (STP) interconnected to said signaling link consolidator with another signaling link, said circuitry comprising:
    means for producing a message;
    means for translating, if feasible, a first portion of said destination number into a destination point code corresponding to said STP;

means for requesting further translation if said first portion of said destination number cannot be translated;

means for translating, in response to said request for further translation, a second portion of said destination number into said destination point code;

means for addressing said message to said another node corresponding to said destination point code;

means for sending, via said signaling links, said message to said another node or said STP depending upon said destination point code.

23. The circuitry of claim 22 wherein said destination number has the form NPA-NXX-XXXX, wherein said first portion of the destination number is an NPA number and said second portion of the destination number is an NXX number.

24. The circuitry of claim 23 wherein said first portion translating means further comprises an NPA table which uses the NPA number to determine said destination point code.

25. The circuitry of claim 23 wherein said second portion translating means further comprises an NXX table which uses the NXX number to determine said destination point code.

26. A telecommunications network containing circuitry for providing direct message routing between nodes in the telecommunications network composed of service switching points (SSPs) and a signaling link consolidator, said SSPs being connected to said signaling link consolidator by signaling links, said apparatus being located in a first node of said telecommunications network, said first node providing a destination number of another node, said telecommunications network cooperatively arranged with a signal transfer point (STP) interconnected to said signaling link consolidator with another signaling link, said circuitry comprising:

means for producing a message;

means for translating, if feasible, a first portion of said destination number into a destination point code corresponding to said STP;

means for requesting further translation if said first portion of said destination number cannot be translated;

means for translating, in response to said request for further translation, a second portion of said destination number into said destination point code;

means for addressing said message to said another node corresponding to said destination point code;

means for sending, via said signaling links, said message to said another node or said STP depending upon said destination point code, wherein said destination number has the form NPA-NXX-XXXX, wherein said first portion of the destination number is an NPA number and said second portion of the destination number is an NXX number, and wherein said first portion translating means further comprises an NPA table which uses the NPA number to determine said destination point code, means for retrieving an information field from said NPA table;

means for determining from said information field if said NPA number is supported by said NPA table; and means for assigning said destination point code to said message such that said message containing said destination number is routed to said STP if said determining means indicates that said NPA number is not supported by said NPA table.

27. A telecommunications network containing circuitry for providing direct message routing between nodes in the telecommunications network composed of service switching points (SSPs) and a signaling link consolidator, said SSPs being connected to said signaling link consolidator by signaling links, said apparatus being located in a first node of said telecommunications network, said first node providing a destination number of another node, said telecommunications network cooperatively arranged with a signal transfer point (STP) interconnected to said signaling link consolidator with another signaling link, said circuitry comprising:

means for producing a message;

means for translating, if feasible, a first portion of said destination number into a destination point code corresponding to said STP;

means for requesting further translation if said first portion of said destination number cannot be translated;

means for translating, in response to said request for further translation, a second portion of said destination number into said destination point code;

means for addressing said message to said another node corresponding to said destination point code;

means for sending, via said signaling links, said message to said another node or said STP depending upon said destination point code, wherein said destination number has the form NPA-NXX-XXXX, wherein said first portion of the destination number is an NPA number and said second portion of the destination number is an NXX number, and wherein said second portion translating means further comprises an NXX table which uses the NXX number to determine said destination point code, means for retrieving an information field from said NXX table;

means for determining from said information field if said NXX number is supported by said NXX table;

means for routing said destination number to said STP if said determining means indicates that said NXX number is not supported by said NXX table;

means for determining if said information field contains said destination point code;

means for inserting said destination point code into said message; and means for routing said message to said another node that corresponds to said destination point code.

28. The circuitry of claim 22 wherein said message is a custom area signaling service (CLASS) message.

29. A method of routing signaling messages among service switching points (SSPs) forming a network, said SSPs being connected to a signaling link consolidator with signaling links, said method comprising the steps of:

producing a signaling message in an originating SSP;

addressing said signaling message to a destination SSP within the network of SSPs;

addressing said signaling message to a signaling transfer point (STP) external to the network of SSPs, the STP being connected to said signaling link consolidator with another signaling link;

translating a portion of a destination number provided by the originating SSP into a destination point code for use as an address of said destination SSP or said STP to which the signaling message is to be sent; and sending, via said signaling links and said signaling link consolidator, said signaling message to said destination SSP.

30. The method of claim 29 wherein said translating step further comprises:
translating if feasible a first portion of said destination number into said destination point code corresponding to said STP;
requesting further translation if said first portion of said destination number cannot be translated; and
translating, in response to said request for further translation, a second portion of said destination number into said destination point code corresponding to said destination SSP.

31. The method of claim 30 wherein said destination number has the form NPA-NXX-XXXX, wherein said first portion of the destination number is an NPA number and said second portion of the destination number is an NXX number.

32. The method of claim 31 wherein the first portion translating step further comprises the steps of:
accessing a location in an NPA table using said NPA number as a pointer into the NPA table; and
retrieving said destination point code located at the accessed NPA table location.

33. The method of claim 32 wherein the second portion translating step further comprises the steps of:
accessing a location in an NXX table using said NXX number as a pointer into the NPA table; and
retrieving said destination point code located at the accessed NXX table location.

34. A method of routing signaling messages among service switching points (SSPs) forming a network, said SSPs being connected to a signaling link consolidator with signaling links, said method comprising the steps of:
producing a signaling message in an originating SSP;
addressing said signaling message to either a destination SSP within the network of SSPs or to a signaling transfer point (STP) external to the network of SSPs, the STP being connected to said signaling link consolidator with another signaling link; and
sending, via said signaling links and said signaling link consolidator, said signaling message to said destination SSP,
wherein said originating SSP provides a destination number and wherein said addressing step further comprises the step of translating a portion of said destination number into a destination point code for use as an address of said destination SSP or said STP to which the signaling message is to be sent,
wherein said translating step further comprises;
translating, if feasible, a first portion of said destination number into said destination point code corresponding to said STP;
requesting further translation if said first portion of said destination number cannot be translated; and
translating, in response to said request for further translation, a second portion of said destination number into said destination point code corresponding to said destination SSP,
wherein said destination number has the form NPA-NXX-XXXX, wherein said first portion of the destination number is an NPA number and said second portion of the destination number is an NXX number,
wherein said first portion translating step further comprises the steps of:
accessing a location in an NPA table using said NPA number as a pointer into the NPA table;
retrieving an information field located at the accessed NPA table location;
determining from said information field if said NPA number is supported by said NPA table;
routing said destination number to said STP if said determining step indicates that said NPA number is not supported by said NPA table; and
if said NPA number is supported by said NPA table, then proceeding to said step of requesting further translation.

35. A method of routing signaling messages among service switching points (SSPs) forming a network, said SSPs being connected to a signaling link consolidator with signaling links, said method comprising the steps of:
producing a signaling message in an originating SSP;
addressing said signaling message to either a destination SSP within the network of SSPs or to a signaling transfer point (STP) external to the network of SSPs, the STP being connected to said signaling link consolidator with another signaling link; and
sending, via said signaling links and said signaling link consolidator, said signaling message to said destination SSP,
wherein said originating SSP provides a destination number and wherein said addressing step further comprises the step of translating a portion of said destination number into a destination point code for use as an address of said destination SSP or said STP to which the signaling message is to be sent,
wherein said translating step further comprises:
translating, if feasible, a first portion of said destination number into said destination point code corresponding to said STP;
requesting further translation if said first portion of said destination number cannot be translated; and
translating, in response to said request for further translation, a second portion of said destination number into said destination point code corresponding to said destination SSP,
wherein said destination number has the form NPA-NXX-XXXX, wherein said first portion of the destination number is an NPA number and said second portion of the destination number is an NXX number,
wherein said second portion translating step further comprises the steps of:
accessing a location in an NXX table using said NXX number as a pointer into the NXX table;
retrieving an information field located at the accessed NXX table location;
determining from said information field if said NXX number is supported by said NXX table;
routing said destination number to said STP if said determining step indicates that said NXX number is not supported by said NXX table, otherwise;
determining if said retrieved information field contains said destination point code;
inserting said destination point code into said signaling message if said retrieved information field contains said destination point code;
routing said message to said destination SSP that corresponds to said destination point code; and
if said retrieved information field does not contain said destination point code, then routing said destination number to said STP.

36. A method of routing signaling messages within a network of service switching points (SSPs), wherein said network of SSPs contains at least one signaling link consolidator such that each of said SSPs in said network is connected to said link consolidator through an associated individual signaling link, said method comprising the steps of:

producing a custom local area signaling service (CLASS) message in an originating SSP;

addressing said CLASS message to a destination SSP within the network of SSPs;

addressing said CLASS message to a signaling transfer point (STP) external to the network of SSPs, said STP being connected to said signaling link consolidator with another signaling link; and sending said CLASS message from said originating SSP to said destination SSP or to said STP via said signaling link consolidator, the signaling link connected to said originating SSP, and the signaling link connected to said destination node.

37. The method of claim 36 wherein said originating SSP provides a destination number and wherein said addressing step further comprises the step of:

translating a portion of said destination number into a destination point code for use as an address of said destination SSP or said STP to which the CLASS message is to be sent.

38. The method of claim 37 wherein said translating step further comprises:

translating, if feasible, a first portion of said destination number into said destination point code corresponding to said STP;

requesting further translation if said first portion of said destination number cannot be translated; and translating, in response to said request for further translation, a second portion of said destination number into said destination point code corresponding to said destination SSP.

39. The method of claim 38 wherein said destination number has the form NPA-NXX-XXXX, wherein said first portion of the destination number is an NPA number and said second portion of the destination number is an NXX number.

40. The method of claim 39 wherein the first portion translating step further comprises the steps of:

accessing a location in an NPA table using said NPA number as a pointer into the NPA table; and retrieving said destination point code located at the accessed NPA table location.

41. The method of claim 39 wherein the second portion translation step further comprises the steps of:

accessing a location in an NXX table using said NXX number as a pointer into the NXX table; and retrieving said destination point code located at said accessed NXX table location.

42. A method of routing signaling messages among service switching points (SSPs) forming a network, said SSPs being connected to a signaling link consolidator with signaling links, said method comprising the steps of:

producing a custom local area signaling service (CLASS) message in an originating SSP;

addressing said CLASS message to either a destination SSP within the network of SSPs or to a signaling transfer point (STP) external to the network of SSPs, the STP being connected to said signaling link consolidator with another signaling link; and sending, via said signaling links and said signaling link consolidator, said CLASS message to either said destination SSP or said STP, wherein said originating SSP provides a destination number and wherein said addressing step further comprises the step of translating a portion of said destination number into a destination point code for use as an address of said destination SSP or said STP to which the CLASS message is to be sent, wherein said translating step further comprises:

translating, if feasible, a first portion of said destination number into said destination point code corresponding to said STP;

requesting further translation if said first portion of said destination number cannot be translated; and translating, in response to said request for further translation, a second portion of said destination number into said destination point code corresponding to said destination SSP, wherein said destination number has the form NPA-NXX-XXXX, wherein said first portion of the destination number is an NPA number and said second portion of the destination number is an NXX number, wherein said first portion translating step further comprises the steps of:

accessing a location in an NPA table using said NPA number as a pointer into the NPA table;

retrieving an information field located at the accessed NPA table location;

determining from said information field if said NPA number is supported by said NPA table;

routing said destination number to said STP if said determining step indicates that said NPA number is not supported by said NPA table; and if said NPA number is supported by said NPA table, then proceeding to said step of requesting further translation.

43. A method of routing signaling messages among service switching points (SSPs) forming a network, said SSPs being connected to a signaling link consolidator with signaling links, said method comprising the steps of:

producing a custom local area signaling service (CLASS) message in an originating SSP;

addressing said CLASS message to either a destination SSP within the network of SSPs or to a signaling transfer point (STP) external to the network of SSPs, the STP being connected to said signaling link consolidator with another signaling link; and sending, via said signaling links and said signaling link consolidator, said CLASS message to either said destination SSP or said STP, wherein said originating SSP provides a destination number and wherein said addressing step further comprises the step of translating a portion of said destination number into a destination point code for use as an address of said destination SSP or said STP to which the CLASS message is to be sent, wherein said translating step further comprises:

translating, if feasible, a first portion of said destination number into said destination point code corresponding to said STP;

requesting further translation if said first portion of said destination number cannot be translated; and translating, in response to said request for further translation, a second portion of said destination number into said destination point code corresponding to said destination SSP, wherein said destination number has the form NPA-NXX-XXXX, wherein said first portion of the destination number is an NPA number and said second portion of the destination number is an NXX number, wherein said second portion translating step further comprises the steps of:
   accessing a location in an NXX table using said NXX number as a pointer into the NXX table;
   retrieving an information field located at the accessed NXX table location;
   determining from said information field if said NXX number is supported by said NXX table;
   routing said destination number to said STP if said determining step indicates that said NXX number is not supported by said NXX table, otherwise;
   determining if said retrieved information field contains said destination point code;
   inserting said destination point code into said signaling message if said retrieved information field contains said destination point code;
   routing said message to said destination SSP that corresponds to said destination point code; and
   if said retrieved information field does not contain said destination point code, then routing said destination number to said STP.

44. A method of routing message between nodes from an originating node within a telecommunication network, said nodes being connected to a signaling link consolidator with signaling links, said originating node providing a destination number of a destination node, said telecommunications network cooperatively arranged with a signal transfer point (STP) interconnected to said signaling link consolidator with another signaling link, said method comprising the steps of:
   producing a message at said originating node;
   translating, if feasible, a first portion of said destination number into a destination point code corresponding to said STP;
   requesting further translation if said first portion of said destination number cannot be translated;
   translating, in response to said request for further translation, a second portion of said destination number into said destination point code corresponding to said destination node;
   addressing said message to either said destination node or said STP depending upon the destination point code; and
   sending, via said signaling links, said message to said destination node or said STP depending upon said destination point code.

45. The method of claim 44 wherein said destination number has the form NPA-NXX-XXXX, wherein said first portion of the destination number is an NPA number and said second portion of the destination number is an NXX number.

46. The method of claim 45 wherein the first portion translating step further comprises the steps of:
   accessing a location in an NPA table using said NPA number as a pointer into the NPA table; and
   retrieving said destination point code located at the accessed NPA table location.

47. The method of claim 45 wherein the second portion translation step further comprises the steps of:
   accessing a location in an NXX table using said NXX number as a pointer into the NXX table; and
   retrieving said destination point code located at said accessed NXX table location.

48. A method of routing message between nodes from an originating node within a telecommunication network, said nodes being connected to a signaling link consolidator with signaling links, said originating node providing a destination number of a destination node, said telecommunications network cooperatively arranged with a signal transfer point (STP) interconnected to said signaling link consolidator with another signaling link, said method comprising the steps of:
   producing a message at said originating node;
   translating, if feasible, a first portion of said destination number into a destination point code corresponding to said STP;
   requesting further translation if said first portion of said destination number cannot be translated;
   translating, in response to said request for further translation, a second portion of said destination number into said destination point code corresponding to said destination node;
   addressing said message to either said destination node or said STP depending upon the destination point code; and
   sending, via said signaling links, said message to said destination node or said STP depending upon said destination point code,
   wherein said destination number has the form NPA-NXX-XXXX, wherein said first portion of the destination number is an NPA number and said second portion of the destination number is an NXX number,
   wherein said first portion translating step further comprises the steps of:
      accessing a location in an NPA table using said NPA number as a pointer into the NPA table;
      retrieving an information field located at the accessed NPA table location;
      determining from said information field if said NPA number is supported by said NPA table;
      routing said destination number to said STP if said determining step indicates that said NPA number is not supported by said NPA table; and
      if said NPA number is supported by the NPA table, then proceeding to said step of requesting further translation.

49. A method of routing message between nodes from an originating node within a telecommunication network, said nodes being connected to a signaling link consolidator with signaling links, said originating node providing a destination number of a destination node, said telecommunications network cooperatively arranged with a signal transfer point (STP) interconnected to said signaling link consolidator with another signaling link, said method comprising the steps of:
   producing a message at said originating node;
   translating, if feasible, a first portion of said destination number into a destination point code corresponding to said STP;
   requesting further translation if said first portion of said destination number cannot be translated;
   translating, in response to said request for further translation, a second portion of said destination number into said destination point code corresponding to said destination node;
   addressing said message to either said destination node or said STP depending upon the destination point code; and
   sending, via said signaling links, said message to said destination node or said STP depending upon said destination point code,
   wherein said destination number has the form NPA-NXX-XXXX, wherein said first portion of the destination number is an NPA number and said second portion of the destination number is an NXX number, wherein said second portion translating step further comprises the steps of:
  accessing a location in an NXX table using said NXX number as a pointer into the NXX table;
  retrieving an information field located at the accessed NXX table location;
  determining from said information field if said NXX number is supported by said NXX table;
  routing said destination number to said STP if said determining step indicates that said NXX number is not supported by said NXX table, otherwise;
  determining if said retrieved information field contains said destination point code;
  inserting said destination point code into said message if said retrieved information field contains said destination point code;
  routing said message to said destination node that corresponds to said destination point code; and
  if said retrieved information field does not contain a destination point code, then routing said destination number to said STP.

50. The method of claim 44 wherein said message is a custom local area signaling services (CLASS) message.

51. A method of routing message between nodes from an originating node within a telecommunication network, said nodes being connected to a signaling link consolidator with signaling links, said originating node providing a destination number of a destination node, said telecommunications network cooperatively arranged with a signal transfer point (STP) interconnected to said signaling link consolidator with another signaling link, said method comprising the steps of:
  producing a message at said originating node;
  translating, if feasible, a first portion of said destination number into a destination point code corresponding to said STP;
  requesting further translation if said first portion of said destination number cannot be translated;
  translating, in response to said request for further translation, a second portion of said destination number into said destination point code corresponding to said destination node;
  addressing said message to either said destination node or said STP depending upon the destination point code; and
  sending, via said signaling links, said message to said destination node or said STP depending upon said destination point code,
  wherein said destination number has the form NPA-NXX-XXXX, wherein said first portion of the destination number is an NPA number and said second portion of the destination number is an NXX number,
  wherein said first portion translating step further comprises the steps of:
    accessing a location in an NPA table using said NPA number as a pointer into the NPA table;
    retrieving an information field located at the accessed NPA table location;
    determining from said information field if said NPA number is supported by said NPA table;
    routing said destination number to said STP if said determining step indicates that said NPA number is not supported by said NPA table; and
    if said NPA number is supported by the NPA table, then proceeding to said step of requesting further translation,
  wherein said originating node is an SSP.

52. A method of routing message between nodes from an originating node within a telecommunication network, said nodes being connected to a signaling link consolidator with signaling links, said originating node providing a destination number of a destination node, said telecommunications network cooperatively arranged with a signal transfer point (STP) interconnected to said signaling link consolidator with another signaling link, said method comprising the steps of:
  producing a message at said originating node;
  translating, if feasible, a first portion of said destination number into a destination point code corresponding to said STP;
  requesting further translation if said first portion of said destination number cannot be translated;
  translating, in response to said request for further translation, a second portion of said destination number into said destination point code corresponding to said destination node;
  addressing said message to either said destination node or said STP depending upon the destination point code; and
  sending, via said signaling links, said message to said destination node or said STP depending upon said destination point code,
  wherein said destination number has the form NPA-NXX-XXXX, wherein said first portion of the destination number is an NPA number and said second portion of the destination number is an NXX number,
  wherein said second portion translating step further comprises the steps of:
    accessing a location in an NXX table using said NXX number as a pointer into the NXX table;
    retrieving an information field located at the accessed NXX table location;
    determining from said information field if said NXX number is supported by said NXX table;
    routing said destination number to said STP if said determining step indicates that said NXX number is not supported by said NXX table, otherwise;
    determining if said retrieved information field contains said destination point code;
    inserting said destination point code into said message if said retrieved information field contains said destination point code;
    routing said message to said destination node that corresponds to said destination point code; and
    if said retrieved information field does not contain a destination point code, then routing said destination number to said STP,
  wherein said originating node is an SSP.

* * * * *